US010616808B2

(12) United States Patent
Mohan et al.

(10) Patent No.: US 10,616,808 B2
(45) Date of Patent: Apr. 7, 2020

(54) EXCHANGING NETWORK SERVER REGISTRATION CREDENTIALS OVER A D2D NETWORK

(71) Applicant: QUALCOMM Incorporated, San Diego, CA (US)

(72) Inventors: Prashanth Mohan, Chennai (IN); Santhana Palanisamy, Hyderabad (IN); Manjunatha Subbamma Ananda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 15/214,080

(22) Filed: Jul. 19, 2016

(65) Prior Publication Data

US 2018/0027458 A1 Jan. 25, 2018

(51) Int. Cl.

| | |
|---|---|
| *H04L 9/00* | (2006.01) |
| *H04L 29/06* | (2006.01) |
| *H04W 36/00* | (2009.01) |
| *H04W 12/04* | (2009.01) |
| *H04W 48/08* | (2009.01) |
| *H04W 88/04* | (2009.01) |

(Continued)

(52) U.S. Cl.
CPC ....... *H04W 36/0033* (2013.01); *H04L 63/061* (2013.01); *H04L 63/18* (2013.01); *H04L 65/1016* (2013.01); *H04L 65/1073* (2013.01); *H04W 12/04* (2013.01); *H04W 36/0038* (2013.01); *H04W 48/08* (2013.01); *H04W 36/03* (2018.08); *H04W 36/14* (2013.01); *H04W 48/10* (2013.01); *H04W 52/0277* (2013.01); *H04W 88/04* (2013.01)

(58) Field of Classification Search
None
See application file for complete search history.

(56) References Cited

U.S. PATENT DOCUMENTS 7,986,914 B1 * 7/2011 Henry, Jr. ............... H04L 51/38
455/3.06
8,265,599 B2 9/2012 Zohar
(Continued)

FOREIGN PATENT DOCUMENTS

| | | |
|---|---|---|
| EP | 2741459 A1 | 6/2014 |
| WO | 2015051844 A1 | 4/2015 |

OTHER PUBLICATIONS

International Search Report and Written Opinion—PCT/US2017/034631—ISA/EPO—dated Sep. 1, 2017.

*Primary Examiner* — Sithu Ko
(74) *Attorney, Agent, or Firm* — Muncy, Geissler, Olds & Lowe, P.C.

(57) ABSTRACT

In an embodiment, a client device receives a set of network registration credentials configured to authorize access to one or more network services provided by a network server. The client device shares the set of network registration credentials with an external device (e.g., a peer client device or an access point) via D2D. In another embodiment, a device (e.g., the external device or a different device) receives the set of network registration credentials via D2D and interacts with the network server to access a network service using the set of network registration credentials. In another embodiment, the device shares the set of network registration credentials with another client device via D2D.

63 Claims, 15 Drawing Sheets

(51) Int. Cl.
  *H04W 52/02* (2009.01)
  *H04W 48/10* (2009.01)
  *H04W 36/14* (2009.01)

(56) References Cited

U.S. PATENT DOCUMENTS

| | | | |
|---|---|---|---|
| 8,514,825 B1* | 8/2013 | Addepalli | H04W 72/0406 370/338 |
| 9,112,844 B2 | 8/2015 | Story, Jr. | |
| 9,225,782 B2* | 12/2015 | Addepalli | H04W 72/0406 |
| 2004/0219954 A1* | 11/2004 | Odinak | H04M 1/6075 455/569.1 |
| 2007/0004457 A1 | 1/2007 | Han | |
| 2007/0234048 A1* | 10/2007 | Ziv | H04M 3/56 713/159 |
| 2008/0039139 A1 | 2/2008 | Teicher | |
| 2008/0081611 A1* | 4/2008 | Hoyt | H04W 8/205 455/425 |
| 2012/0254960 A1* | 10/2012 | Lortz | H04L 63/104 726/7 |
| 2012/0265913 A1* | 10/2012 | Suumaki | H04W 4/08 710/303 |
| 2013/0247161 A1* | 9/2013 | Bajko | H04L 9/3268 726/7 |
| 2013/0277663 A1* | 10/2013 | Nanno | H01L 51/0005 257/40 |
| 2014/0068261 A1* | 3/2014 | Malek | H04W 12/04 713/168 |
| 2014/0204834 A1* | 7/2014 | Singh | H04W 40/22 370/315 |
| 2015/0085848 A1* | 3/2015 | Reunamaki | H04W 12/04 370/338 |
| 2015/0229639 A1* | 8/2015 | Abdulrahiman | H04L 63/0853 455/411 |
| 2015/0312363 A1* | 10/2015 | Robinson | H04L 67/2814 709/219 |
| 2016/0021489 A1* | 1/2016 | Yim | H04L 65/1016 455/41.1 |
| 2016/0021691 A1 | 1/2016 | Lee et al. | |
| 2016/0174273 A1* | 6/2016 | Ginnela | H04W 76/18 455/39 |

\* cited by examiner

EXCHANGING NETWORK SERVER REGISTRATION CREDENTIALS OVER A D2D NETWORK

BACKGROUND

1. Field of the Disclosure

Embodiments relate to exchanging network server registration credentials over a device-to-device (D2D) network.

2. Description of the Related Art

Client devices with device-to-device (D2D) capability can communicate directly with other D2D client devices, and some D2D client devices can also communicate with access points (APs) which can connect the D2D client devices to one or more external networks. For example, some D2D client devices can be configured to connect to an AP in a vehicle (e.g., a car) through which various in-vehicle features can be accessed (e.g., outputting audio via an in-vehicle audio system, using the in-vehicle audio system to engage in a phone call instead of using microphones and speakers equipped on the D2D client device, etc.).

Access to certain network services (e.g., Netflix movie streaming, emergency calls conducted over an IP Multimedia Subsystem (IMS) service, etc.) provided by a network server are only granted after a registration procedure. For example, a D2D client device can register with the network server and receive a set of network registration credentials which are specific to that particular D2D client device and are used by the D2D client device to access one or more network services. Any D2D client device (or AP) that has not registered itself with the network server and has not received the set of network registration credentials will not typically be capable of accessing these network services.

SUMMARY

An embodiment is directed to a method of operating a client device, including receiving, from a network server that is external to a serving access network of the client device, a set of network registration credentials that are assigned to the client device and are configured to authorize access to one or more network services provided by the network server, and sharing the set of network registration credentials with an external device via a device-to-device (D2D) connection to permit the external device to access the one or more network services provided by the network server based on the shared set of network registration credentials.

Another embodiment is directed to a method of operating a device, including receiving a set of network registration credentials via a device-to-device (D2D) connection, the set of network registration credentials being assigned to a given client device by a network server that is external to a serving access network of the given client device and configured to permit access to one or more network services provided by the network server, and interacting with the network server to access the one or more network services based on the set of network registration credentials.

Another embodiment is directed to a method of operating a device, including receiving a set of network registration credentials via a first device-to-device (D2D) connection, the set of network registration credentials being assigned to a first client device by a network server that is external to a serving access network of the first client device and configured to permit access to one or more network services provided by the network server and sharing the set of network registration credentials with a second client device via a second D2D connection to permit the second client device to access the one or more network services provided by the network server based on the shared set of network registration credentials.

Another embodiment is directed to a client device, including means for receiving, from a network server that is external to a serving access network of the client device, a set of network registration credentials that are assigned to the client device and are configured to authorize access to one or more network services provided by the network server and means for sharing the set of network registration credentials with an external device via a device-to-device (D2D) connection to permit the external device to access the one or more network services provided by the network server based on the shared set of network registration credentials.

Another embodiment is directed to a device, including means for receiving a set of network registration credentials via a device-to-device (D2D) connection, the set of network registration credentials being assigned to a given client device by a network server that is external to a serving access network of the given client device and configured to permit access to one or more network services provided by the network server, and means for interacting with the network server to access the one or more network services based on the set of network registration credentials.

Another embodiment is directed to a device, means for receiving a set of network registration credentials via a first device-to-device (D2D) connection, the set of network registration credentials being assigned to a first client device by a network server that is external to a serving access network of the first client device and configured to permit access to one or more network services provided by the network server, and means for sharing the set of network registration credentials with a second client device via a second D2D connection to permit the second client device to access the one or more network services provided by the network server based on the shared set of network registration credentials.

Another embodiment is directed to a client device, including at least one processor coupled to transceiver circuitry and configured to receive, from a network server that is external to a serving access network of the client device, a set of network registration credentials that are assigned to the client device and are configured to authorize access to one or more network services provided by the network server and share the set of network registration credentials with an external device via a device-to-device (D2D) connection to permit the external device to access the one or more network services provided by the network server based on the shared set of network registration credentials.

Another embodiment is directed to a device, including at least one processor coupled to transceiver circuitry and configured to receive a set of network registration credentials via a device-to-device (D2D) connection, the set of network registration credentials being assigned to a given client device by a network server that is external to a serving access network of the given client device and configured to permit access to one or more network services provided by the network server, and interact with the network server to access the one or more network services based on the set of network registration credentials.

Another embodiment is directed to a device, including at least one processor coupled to transceiver circuitry and configured to receive a set of network registration credentials via a first device-to-device (D2D) connection, the set of network registration credentials being assigned to a first client device by a network server that is external to a serving access network of the first client device and configured to permit access to one or more network services provided by the network server, and share the set of network registration credentials with a second client device via a second D2D connection to permit the second client device to access the one or more network services provided by the network server based on the shared set of network registration credentials.

Another embodiment is directed to a non-transitory computer-readable medium containing instructions stored thereon, which, when executed by a client device, cause the client device to perform operations, the instructions including at least one instruction to cause the client device to receive, from a network server that is external to a serving access network of the client device, a set of network registration credentials that are assigned to the client device and are configured to authorize access to one or more network services provided by the network server, and at least one instruction to cause the client device to share the set of network registration credentials with an external device via a device-to-device (D2D) connection to permit the external device to access the one or more network services provided by the network server based on the shared set of network registration credentials.

Another embodiment is directed to a non-transitory computer-readable medium containing instructions stored thereon, which, when executed by a device, cause the device to perform operations, the instructions including at least one instruction to cause the device to receive a set of network registration credentials via a device-to-device (D2D) connection, the set of network registration credentials being assigned to a given client device by a network server that is external to a serving access network of the given client device and configured to permit access to one or more network services provided by the network server and at least one instruction to cause the device to interact with the network server to access the one or more network services based on the set of network registration credentials.

Another embodiment is directed to a non-transitory computer-readable medium containing instructions stored thereon, which, when executed by a device, cause the device to perform operations, the instructions including at least one instruction to cause the device to receive a set of network registration credentials via a first device-to-device (D2D) connection, the set of network registration credentials being assigned to a first client device by a network server that is external to a serving access network of the first client device and configured to permit access to one or more network services provided by the network server and at least one instruction to cause the device to share the set of network registration credentials with a second client device via a second D2D connection to permit the second client device to access the one or more network services provided by the network server based on the shared set of network registration credentials.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
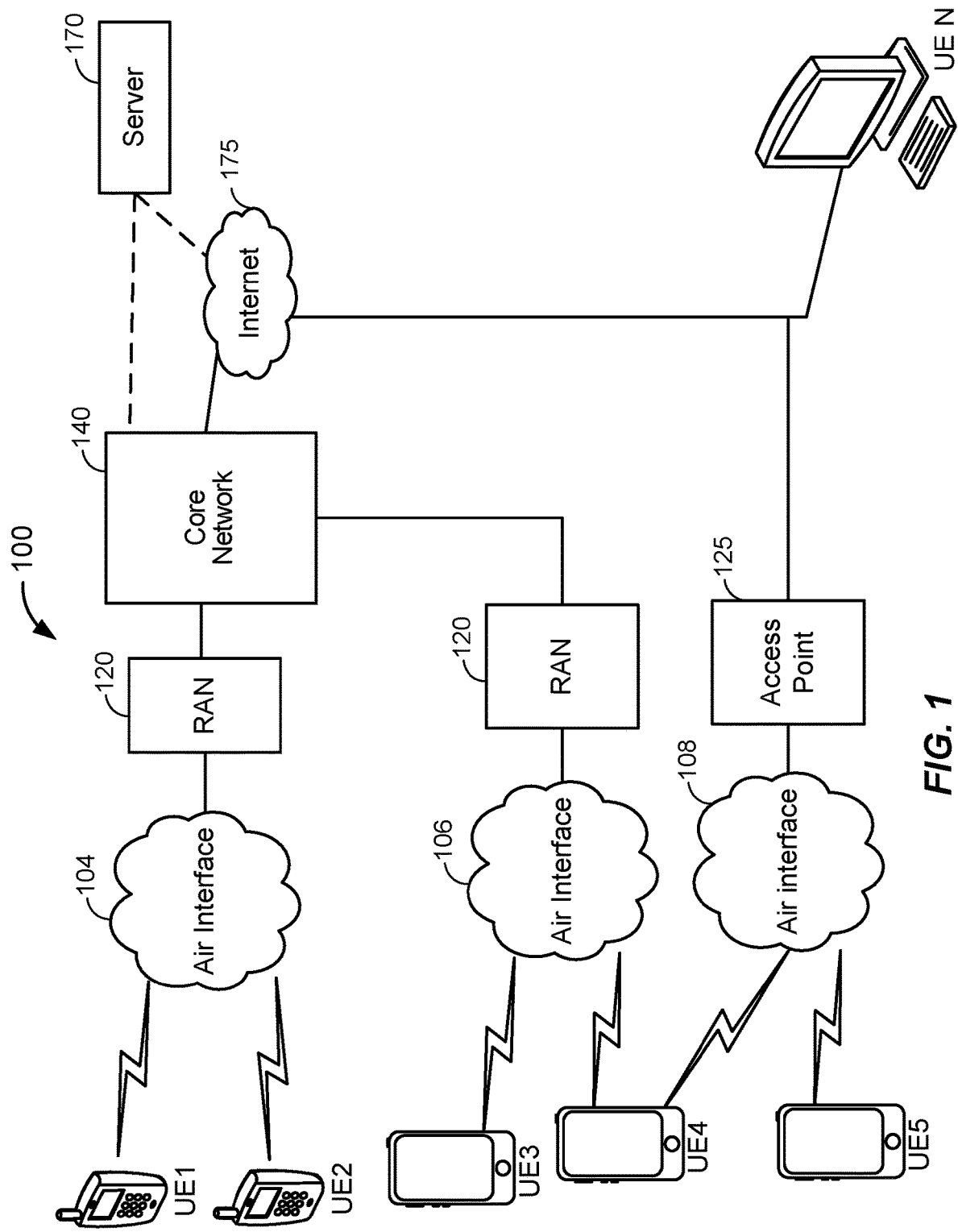
FIG. 1 illustrates a high-level system architecture of a wireless communications system in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit-switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
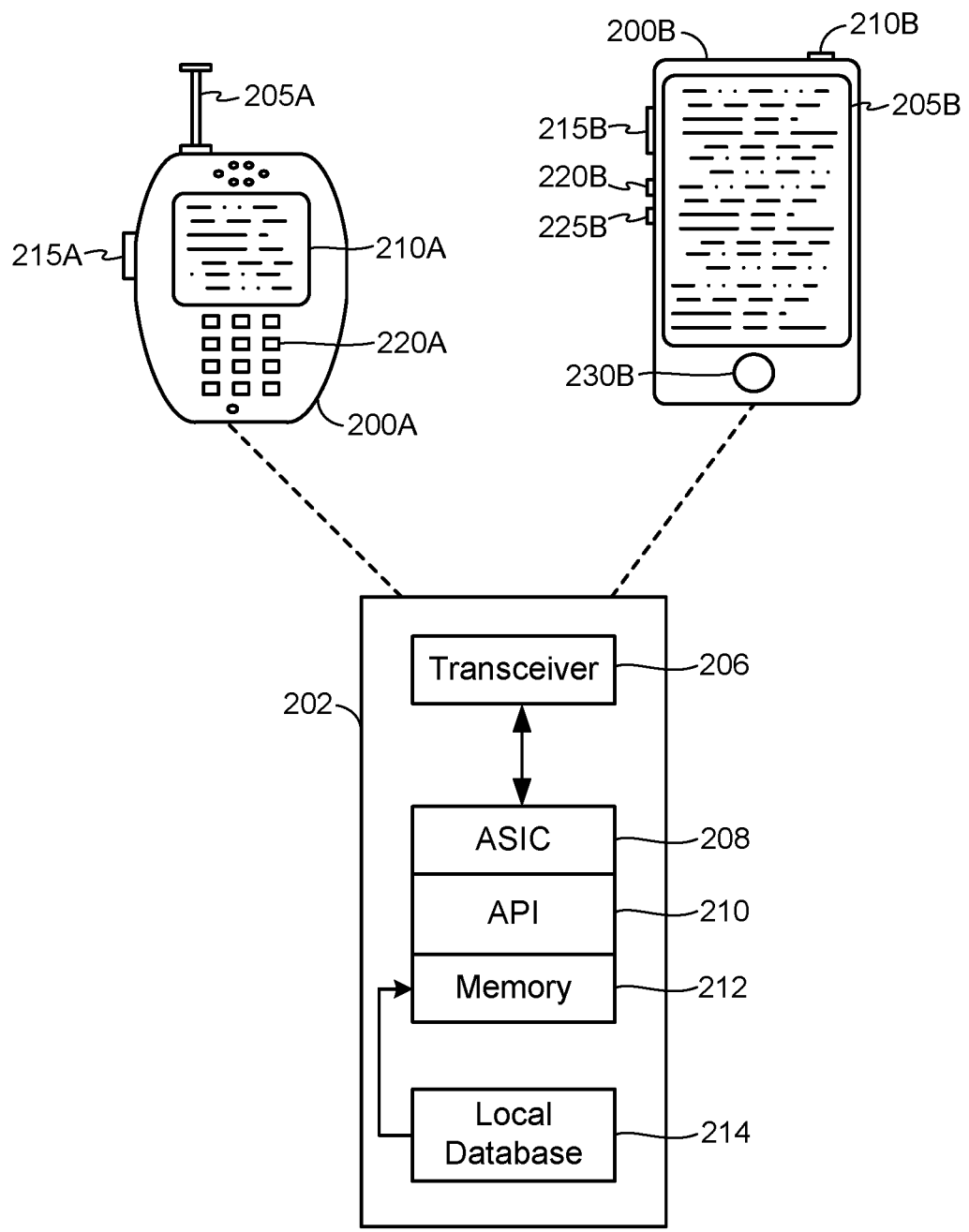
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), and at least one front-panel button 230B (e.g., a Home button, etc.), among other components, as is known in the art. While not shown explicitly as part of UE 200B, UE 200B can include one or more external antennas and/or one or more integrated antennas that are built into the external casing of UE 200B, including but not limited to Wi-Fi antennas, cellular antennas, satellite position system (SPS) antennas (e.g., global positioning system (GPS) antennas), and so on.

While internal components of UEs such as UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes an application programming interface (API) layer 210 that interfaces with any resident programs in a memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in the memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the ASIC 208, the memory 212, the API layer 210 and the local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communications between UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
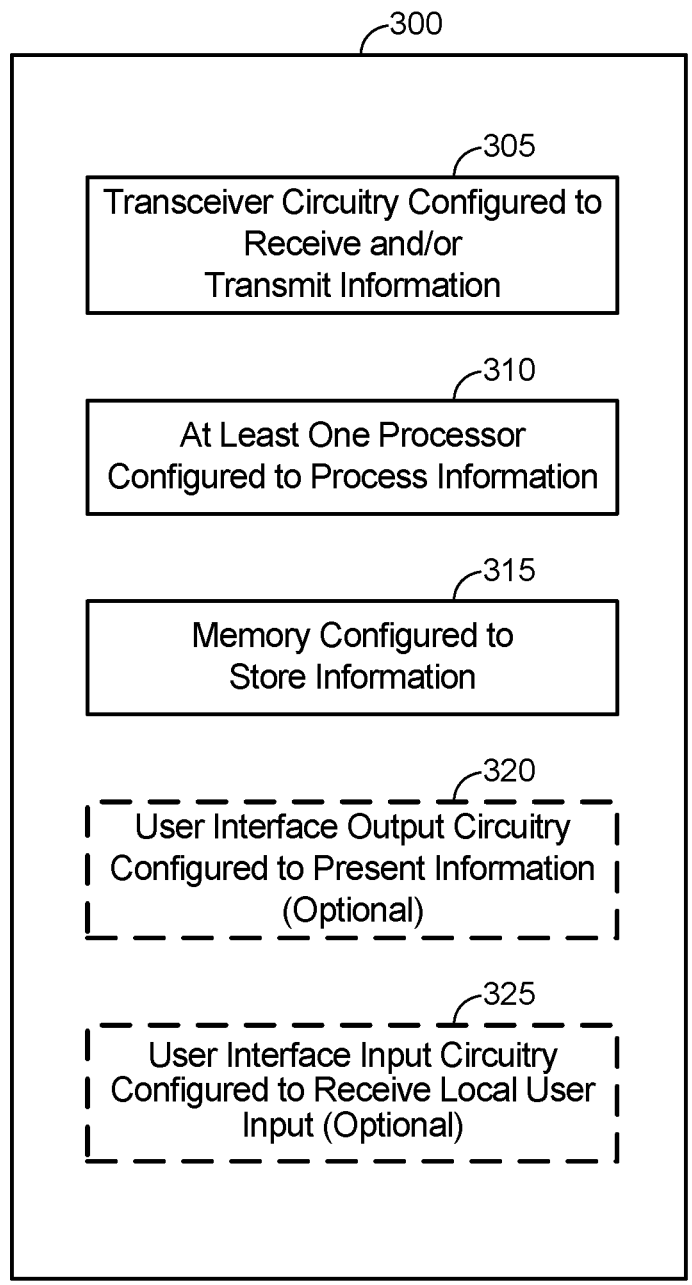
FIG. 3 illustrates a communications device that includes structure configured to perform functionality in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UEs 1 . . . N, UEs 200A and 200B, any component included in the RAN 120 such as base stations, access points or eNodeBs, any component of the core network 140, any components coupled to the Internet 175 (e.g., the application server 170), and so on. Thus, communications device 300 can correspond to any electronic device that is configured to communicate with (or facilitate communication with) one or more other entities over the wireless communications system 100 of FIG. 1.

Referring to FIG. 3, the communications device 300 includes transceiver circuitry configured to receive and/or transmit information 305. In an example, if the communications device 300 corresponds to a wireless communications device (e.g., UE 200A or UE 200B), the transceiver circuitry configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB or Firewire connection, an Ethernet connection through which the Internet 175 can be accessed, etc.). Thus, if the communications device 300 corresponds to some type of network-based server (e.g., the application server 170), the transceiver circuitry configured to receive and/or transmit information 305 can correspond to an Ethernet card, in an example, that connects the network-based server to other communication entities via an Ethernet protocol. In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further optionally includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200A and/or UE 200B as shown in FIG. 2, the user interface output circuitry configured to present information 320 can include the display 210A or 205B. In a further example, the user interface output circuitry configured to present information 320 can be omitted for certain communications devices, such as network communications devices that do not have a local user (e.g., network switches or routers, remote servers, etc.). The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For example, functions such as displaying, outputting, prompting, conveying, etc., may be performed by the user interface output circuitry configured to present information 320 in certain contexts as being specific types of presenting functions. Other functions that correspond to other types of storing functions may also be performed by the user interface output circuitry configured to present information 320.

Referring to FIG. 3, the communications device 300 further optionally includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200A or UE 200B as shown in FIG. 2, the user interface input circuitry configured to receive local user input 325 can include the keypad 220A, button 215A, the display 205B (if a touchscreen), etc. In a further example, the user interface input circuitry configured to receive local user input 325 can be omitted for certain communications devices, such as network communications devices that do not have a local user (e.g., network switches or routers, remote servers, etc.). The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user input function. For example, functions such as obtaining, receiving, collecting, etc., may be performed by the user interface input circuitry configured to receive local user input 325 in certain contexts as being specific types of receiving local user input functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 performs their respective functionality can overlap in part. For example, any software used to facilitate the functionality of the configured structural components of 305 through 325 can be stored in the non-transitory memory associated with the memory configured to store information 315, such that the configured structural components of 305 through 325 each performs their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Figure 4:
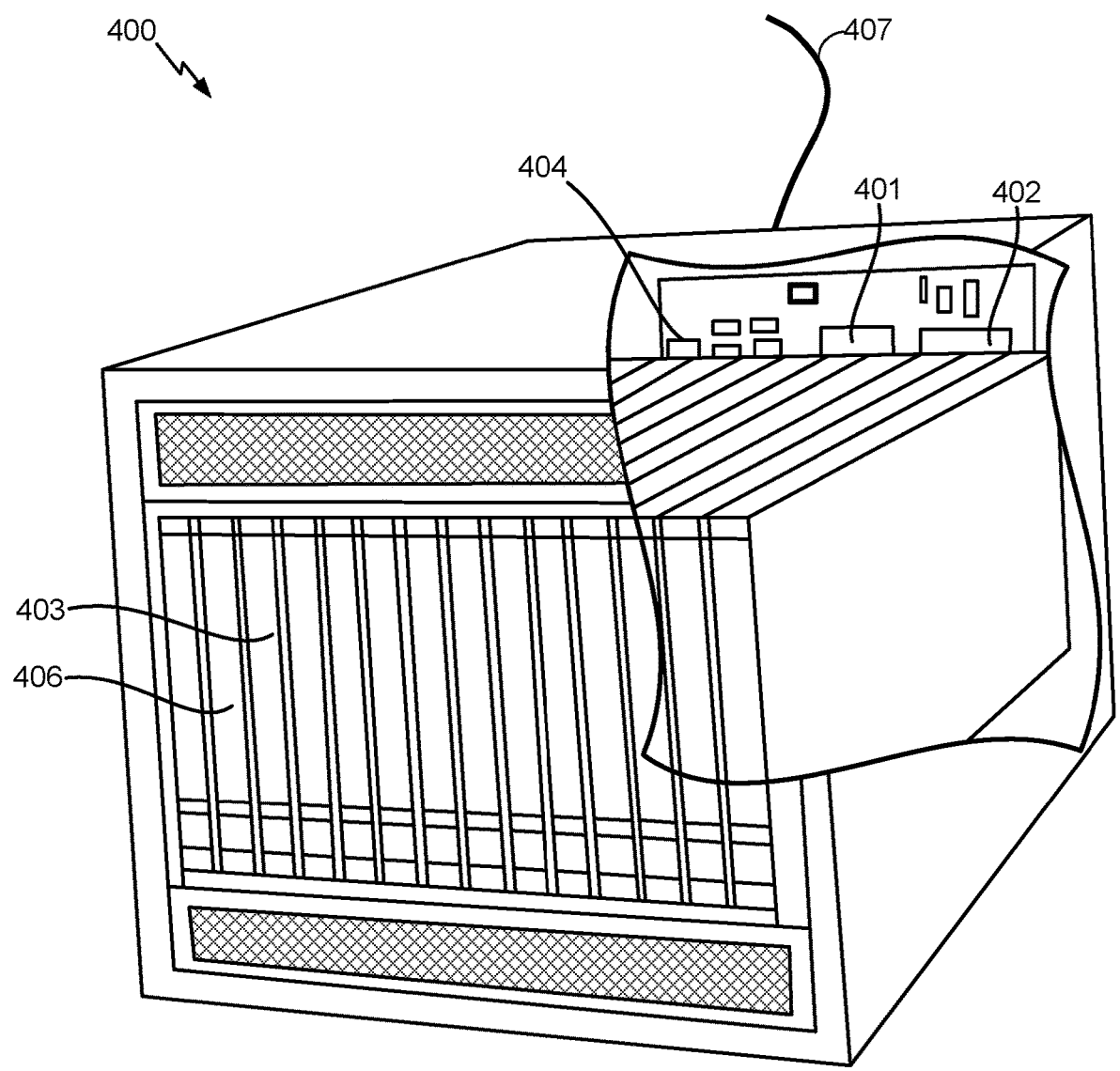
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access points 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communications device 300, whereby the transceiver circuitry configured to transmit and/or receive information 305 corresponds to the network access points 404 used by the server 400 to communicate with the network 407, the at least one processor configured to process information 310 corresponds to the processor 401, and the memory configuration to store information 315 corresponds to any combination of the volatile memory 402, the disk drive 403 and/or the disc drive 406. The optional user interface output circuitry configured to present information 320 and the optional user interface input circuitry configured to receive local user input 325 are not shown explicitly in FIG. 4 and may or may not be included therein. Thus, FIG. 4 helps to demonstrate that the communications device 300 may be implemented as a server, in addition to a UE as in FIG. 2.

Figure 5:
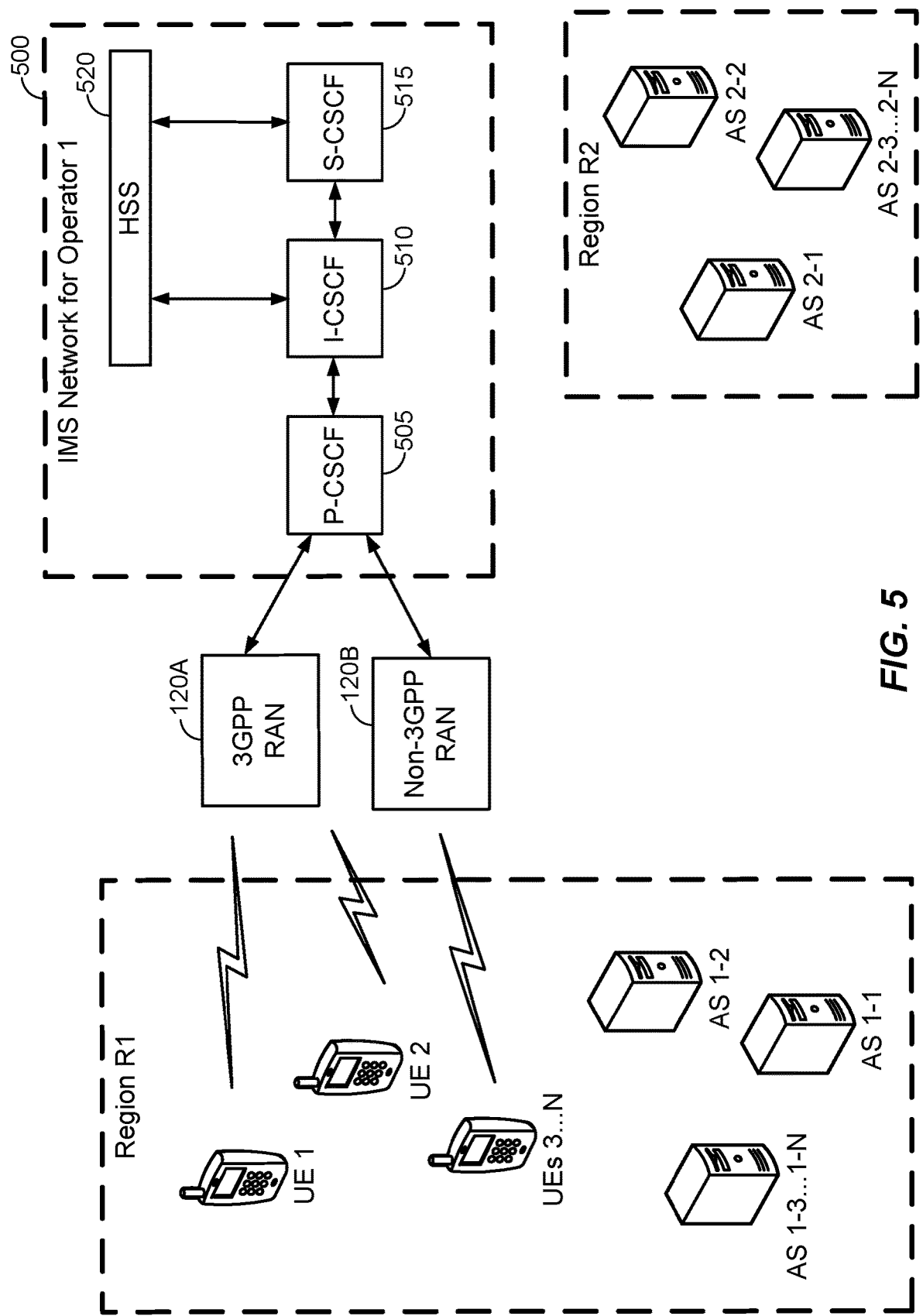
FIG. 5 illustrates an example of Internet Protocol (IP) Multimedia Subsystem (IMS) architecture in accordance with an embodiment of the disclosure.

FIG. 5 illustrates an example of IMS architecture in accordance with an embodiment of the disclosure. Referring to FIG. 5, assume that a first cluster of application servers denoted as AS 1-1, AS 1-2 . . . AS 1-N is configured to provide IMS service to UEs and is located (or deployed) in a first region, and that a second cluster of application servers denoted as AS 2-1, AS 2-2 . . . AS 2-N is configured to provide IMS service to UEs is located (or deployed) in a second region. While not shown in FIG. 5 explicitly, other clusters of application servers can be deployed in other cluster regions as well. In FIG. 5, each cluster of application servers is assumed to be operated by the same operator (e.g., Sprint, Verizon, AT&T, etc.). In FIG. 5, UEs 1 . . . N are assumed to be operating in cluster region R1 and are configured to connect either to a 3GPP RAN 120A or a non-3GPP RAN 120B (e.g., a wired Ethernet connection, a Wi-Fi connection such as access point 125, etc.). UEs 1 . . . N can then connect to an IMS network 500 through either the 3GPP RAN 120A or the non-3GPP RAN 120B.

Referring to FIG. 5, the IMS network 500 is shown as illustrating a particular set of IMS components, including a proxy call session control function (P-CSCF) 505, an interrogating CSCF (I-CSCF) 510, a serving CSCF (S-CSCF) 515 and a Home Subscriber Server (HSS) 520. The P-CSCF 505, I-CSCF 510 and S-CSCF 515 are sometimes referred to collectively as the CSCF, and the CSCF is responsible for signaling via Session Initiation Protocol (SIP) between the Transport Plane, Control Plane, and the Application Plane of the IMS network 500.

Referring to the P-CSCF 505 of FIG. 5, the P-CSCF 505 is responsible for interfacing directly with Transport Plane components and is the first point of signaling within the IMS network 500 for any end-point, such as UEs 1 . . . N. Once an endpoint acquires IP connectivity, the end point will cause a registration event to occur by first signaling to the P-CSCF 505. As the name implies, the P-CSCF 505 is a proxy for SIP messages from end-points to the rest of the IMS network 500. It is usually in a home network of the end point, but may reside in a visited network of the end point. The P-CSCF 505 will use a DNS look-up to identify a target I-CSCF 510 to send SIP messages, which could be an I-CSCF 510 in its own network or another I-CSCF 510 across an administrative domain. The P-CSCF 505 can also be responsible for policy decisions (e.g., via an integrated or standalone Policy Decision Function (PDF) in Releases 5 or 6 of IMS, via a Policy Charging and Resource Function (PCRF) in Release 7 of IMS, etc.).

Referring to the I-CSCF 510 of FIG. 5, the main function of the I-CSCF 510 is to proxy between the P-CSCF 505 as entry point and S-CSCF 515 as control point for applications found in the Applications Plane. When the P-CSCF 505 receives a registration request SIP message, it will perform a DNS look-up to discover the appropriate I-CSCF 510 to route the message. Once the I-CSCF 510 receives the SIP message, it will perform a look-up operation with the HSS 520 via Diameter to determine the S-CSCF 515 that is associated with the end-point terminal. Once it receives this information, it will forward the SIP message to the appropriate S-CSCF 515 for further treatment.

Referring to the S-CSCF 515, the S-CSCF 515 is responsible for interfacing with the Application Servers (AS) (e.g., such as AS 1-1, AS 1-2 . . . AS 1-N in cluster region R1, or AS 2-1, AS 2-2 . . . AS 2-N in cluster region 2, and so on) in the Application Plane. Upon receiving a registration request SIP message from an I-CSCF 510, the S-CSCF 515 will query the HSS 520 via Diameter protocol to register the terminal as being currently served by itself. Subsequent session establishment requires knowing which S-CSCF 515 is responsible for the terminal session control. As part of the registration process, the S-CSCF 515 uses credentials it obtains from the query to the HSS 520 to issue an SIP message "challenge" back to the initiating P-CSCF 505 to authenticate the terminal.

In addition to acting as a registrar, the S-CSCF 515 is also responsible for routing SIP messages to the AS allowing for the Control Plane session control to interact with the Application Plane application logic. To do this, the S-CSCF 515 uses information obtained from the HSS 520 in the form of Initial Filter Criteria (IFC) that acts as triggers against inbound session establishment requests. The IFC includes rules that define how and where SIP messages should be routed to the various application servers that may reside in the Application Plane. The S-CSCF 515 may also act on Secondary Filter Criteria (SFC) obtained from the application servers during the course of messaging with them.

Referring to FIG. 5, a UE that requests IMS service (e.g., registration to set-up or join a VoIP session, a PTT session, a group communication session, etc.) from the IMS network 500 is assigned (or registered) to a target application server that is selected by the S-CSCF 515, as noted above. Generally, the IMS network 500 will attempt to select, as the target application server, an application server that is physically close to the UE and is also known to be capable of providing the requested IMS service.

Figure 6A:
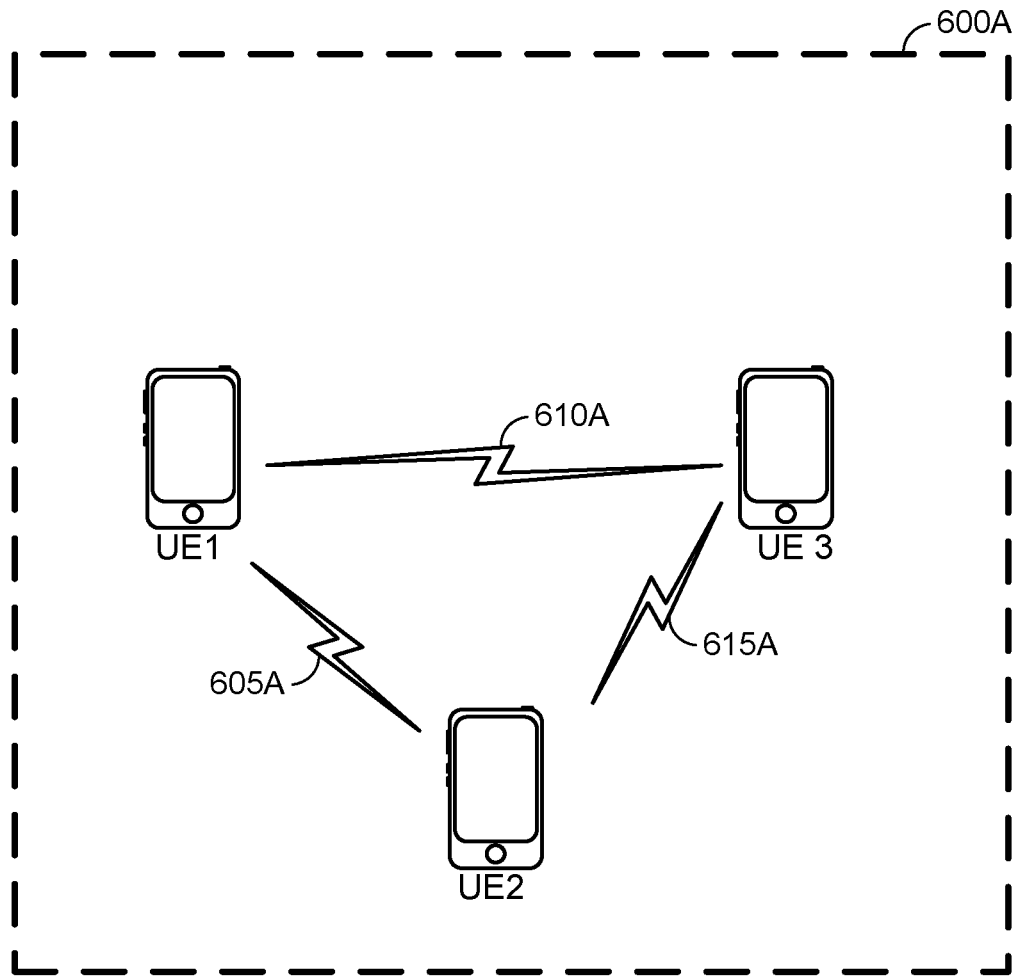
FIG. 6A illustrates a device-to-device (D2D) network in accordance with an embodiment of the disclosure.

FIG. 6A illustrates a D2D network 600A in accordance with an embodiment of the disclosure. Referring to FIG. 6A, the D2D network 600A includes UEs 1 . . . 3 which are configured to communicate with each other via D2D links 605A, 610A and 615A. The D2D links 605A, 610A and 615A can be based upon any well-known D2D communication scheme, including but not limited to Bluetooth, Near Field Communication (NFC), Wi-Fi or IEEE 802.11, Wi-Fi Direct, LTE-Direct (LTE-D), and so on.

Figure 6B:
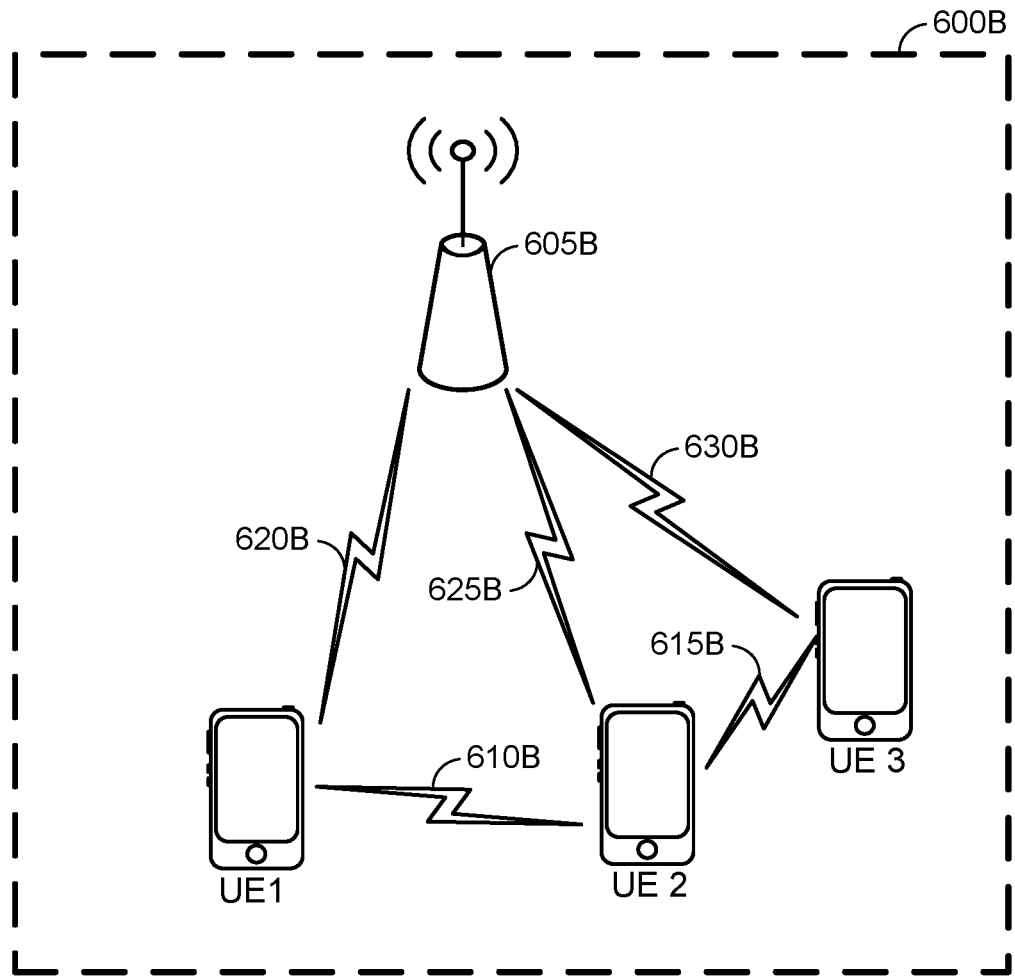
FIG. 6B illustrates a D2D network in accordance with another embodiment of the disclosure.

FIG. 6B illustrates a D2D network 600B in accordance with another embodiment of the disclosure. Referring to FIG. 6B, the D2D network 600B includes an AP 605B and UEs 1 . . . 3 which are configured to communicate with each other via D2D links 610B and 615B (which not shown explicitly in FIG. 6A, UE 1 and UE 3 may also be capable of D2D communication). In FIG. 6B, each of UEs 1 . . . 3 are further connected to the AP 605B via D2D links 620B, 625B and 630B. The D2D links 610B-630B can be based upon any well-known D2D communication scheme, including but not limited to Bluetooth, NFC, Wi-Fi or IEEE 802.11, Wi-Fi Direct, LTE-D, and so on.

Figure 6C:
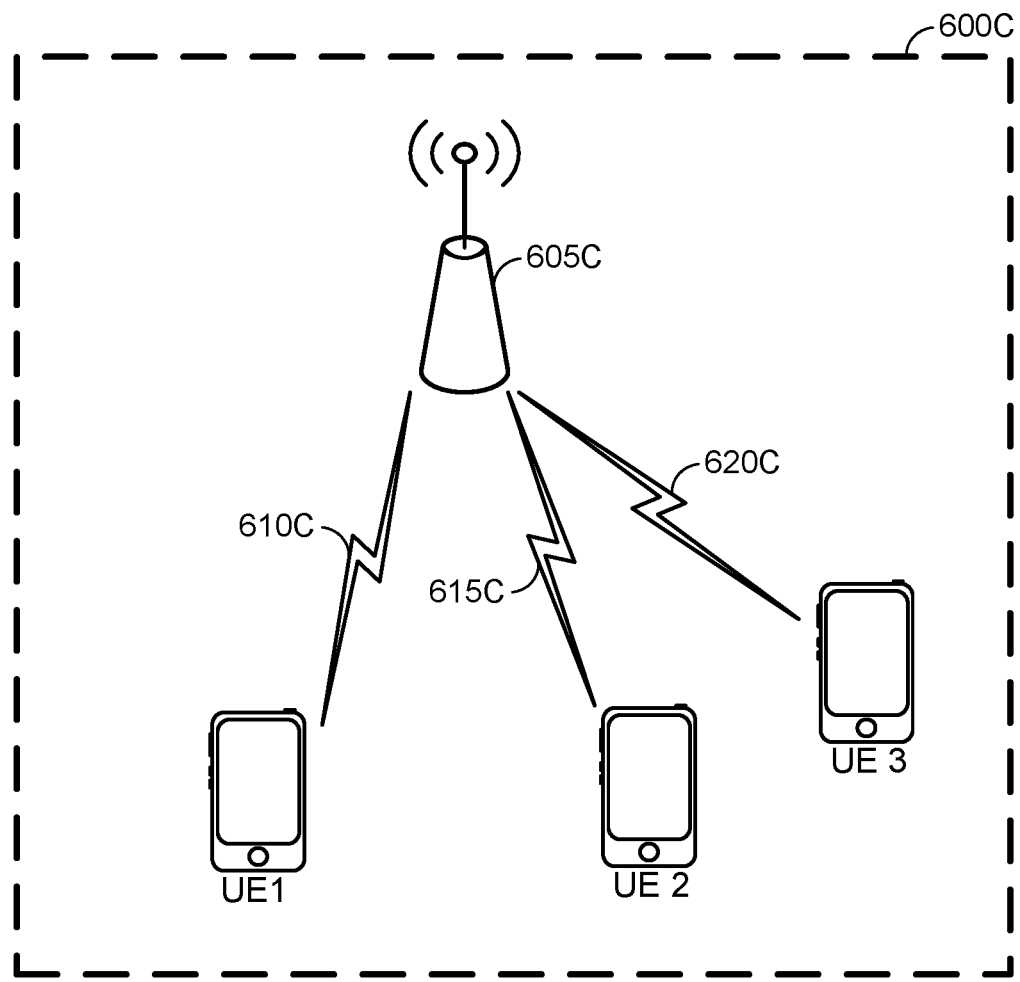
FIG. 6C illustrates a D2D network in accordance with another embodiment of the disclosure.

FIG. 6C illustrates a D2D network 600C in accordance with another embodiment of the disclosure. Referring to FIG. 6C, the D2D network 600C includes an AP 605C and UEs 1 . . . 3. Unlike the embodiment of FIG. 6B, UEs 1 . . . 3 in the D2D network 600C of FIG. 6C are not setup for D2D communication with each other. In FIG. 6C, each of UEs 1 . . . 3 are connected to the AP 605C via D2D links 610C, 615C and 620C, which can be based upon any well-known D2D communication scheme, including but not limited to Bluetooth, NFC, Wi-Fi or IEEE 802.11, Wi-Fi Direct, LTE-D, and so on.

As will be appreciated from a review of FIGS. 6A-6C, D2D networks as used herein may include UEs in direct communication with each other without a supporting AP (e.g., FIG. 6A), UEs that are in direct communication with each other with a supporting AP (e.g., FIG. 6B) and/or UEs that are in direct communication with an AP without being configured for direct communication with each other (e.g., FIG. 6C).

Figure 7:
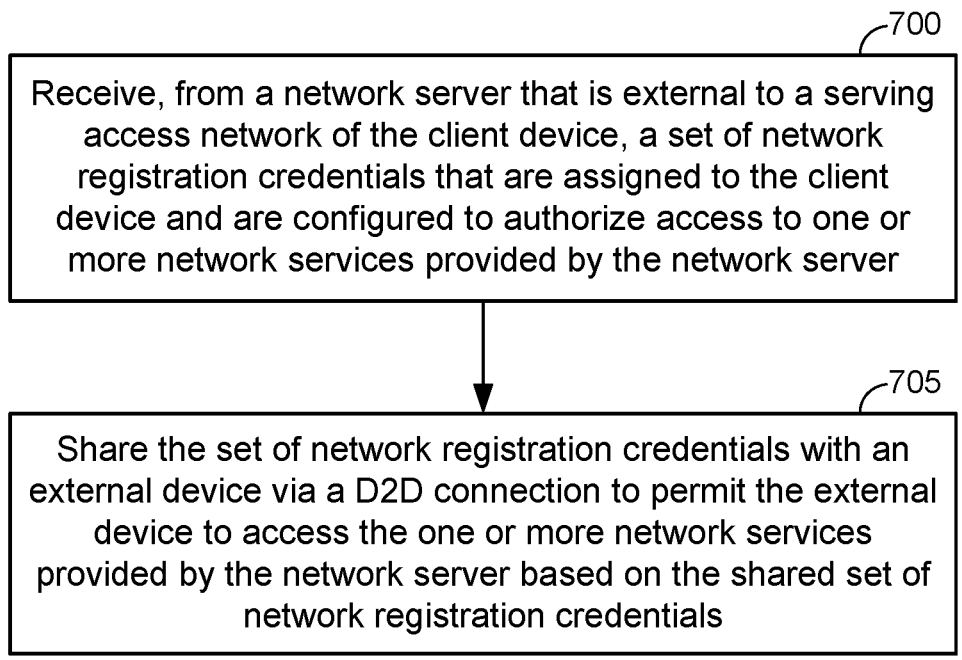
FIG. 7 illustrates a process of sharing one or more network registration credentials in accordance with an embodiment of the disclosure.

FIG. 7 illustrates a process of sharing one or more network registration credentials in accordance with an embodiment of the disclosure. For example, the process of FIG. 7 may be performed by a client device, such as any of UEs 1 . . . 3 in any of the D2D networks depicted in FIGS. 6A-6C.

Referring to FIG. 7, at block 700, the client device receives, from a network server (e.g., application server 170, server 400, an application server or a component of IMS network 500, etc.) that is external to a serving access network (e.g., RAN 120) of the client device, a set of network registration credentials that are assigned to the client device and are configured to authorize access to one or more network services provided by the network server. The set of network registration credentials can include any type of network registration credential that is used by the network server to verify the client device's registration to the network service(s) provided by the network server, including but not limited to subscriber identity module (SIM) credentials, a username and password combination, and so on. The network services that can be accessed using the above-noted set of network registration credentials includes IMS-based communication sessions (e.g., phone calls, video calls, emergency calls, an IMS call pulling or VICE, etc.), video streaming services (e.g., Netflix movie streaming, etc.), music streaming services (e.g., Pandora, Spotify, iTunes, etc.), file uploads or downloads, and so on.

Referring to FIG. 7, at block 705, the client device shares the set of network registration credentials with an external device via a D2D connection to permit the external device to access the one or more network services provided by the network server based on the shared set of network registration credentials. As will be explained below in more detail, the external device can include another D2D-connected client device (e.g., any of UEs 1 . . . 3 in the D2D network 600A of FIG. 6A or the D2D network 600B of FIG. 6B) or a serving AP (e.g., AP 605B in FIG. 6B or AP 605C in FIG. 6C). Moreover, as will be explained in more detail below, the external device can use the shared set of network registration credentials to access the one or more network services on behalf of the client device (e.g., offloading a transmit-receive function between the client device and the RAN from the client device to the external device during initial session setup by handing off an existing session), the external device can use the shared set of network registration credentials to access the one or more network services for its own purposes (e.g., an operator of the external device initiates a network service session), the external device can distribute the shared set of network registration credentials to yet another external device (e.g., AP aggregates the network registration credentials of its served UEs for selective redistribution among the served UEs) or any combination thereof.

Figure 8:
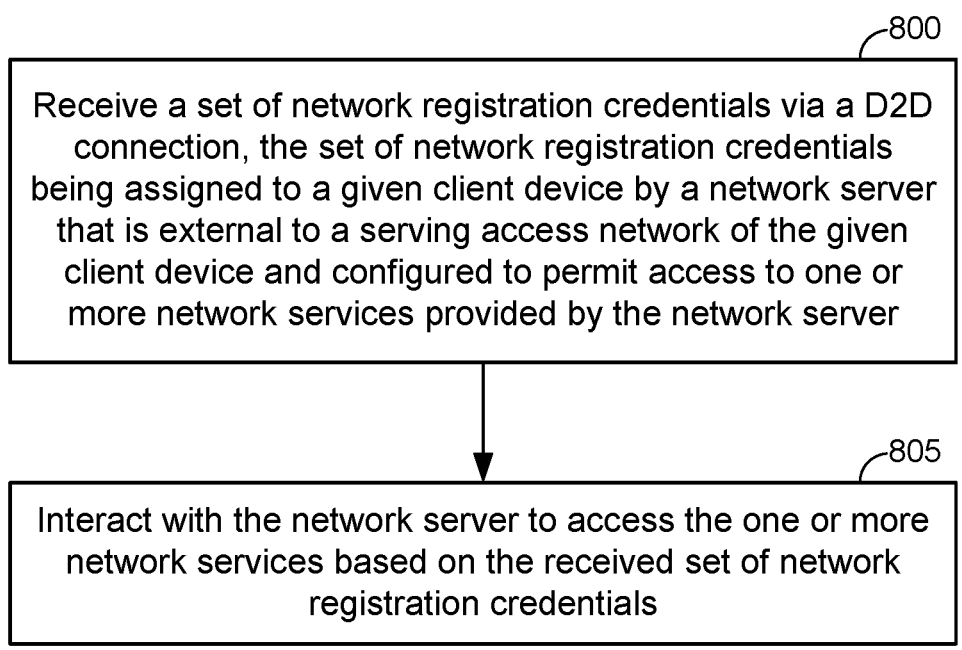
FIG. 8 illustrates a process of accessing a network service based on one or more shared network registration credentials in accordance with an embodiment of the disclosure.

FIG. 8 illustrates a process of accessing a network service based on one or more shared network registration credentials in accordance with an embodiment of the disclosure. For example, the process of FIG. 8 may be performed by a client device, such as any of UEs 1 . . . 3 in any of the D2D networks depicted in FIGS. 6A-6C, or alternatively by an AP, such as AP 605B of FIG. 6B or AP 605C of FIG. 6C.

Referring to FIG. 8, at block 800, the device receives a set of network registration credentials via a D2D connection, the set of network registration credentials being assigned to a given client device (e.g., any of UEs 1 . . . 3 in any of the D2D networks depicted in FIGS. 6A-6C) by a network server (e.g., application server 170, communications device 300, server 400, an application server or a component of IMS network 500, etc.) that is external to a serving access network (e.g., RAN 120) of the given client device and configured to permit access to one or more network services provided by the network server. In an example, the set of network registration credentials received at block 800 may correspond to the set of network credentials shared at block 705 during the process of FIG. 7. In an alternative example, the set of network registration credentials received at block 800 may correspond to the set of network credentials shared at block 905 during the process of FIG. 9, which is discussed in more detail below.

Referring to FIG. 8, at block 805, the device interacts with the network server to access the one or more network services based on the set of network registration credentials. As will be discussed in more detail below, the interaction that occurs at block 805 can be performed on behalf of the given client device that shared the set of network registration credentials. For example, assume that the device performing the process of FIG. 8 is an in-vehicle AP and the given client device is a smartphone. The smartphone may share the set of network registration credentials with the in-vehicle AP at block 800 to facilitate the in-vehicle AP to act as an end-point for a phone call by performing a transmit-receive function for any call-related traffic exchanged with the RAN, which conserves battery life on the smartphone. The in-vehicle AP may then relay the call traffic to the smartphone for playback, or alternatively may route any call traffic to an in-vehicle audio system for playback. Alternatively, the interaction that occurs at block 805 may be in association with a session that is initiated by the device performing the process of FIG. 8. For example, assume that the device performing the process of FIG. 8 is a first smartphone and the given client device is a second smartphone. The first smartphone may use the shared network registration credentials of the second smartphone to initiate a communication session that does not involve the second smartphone, with the first smartphone effectively masquerading as the second smartphone from the perspective of the network server.

Figure 9:
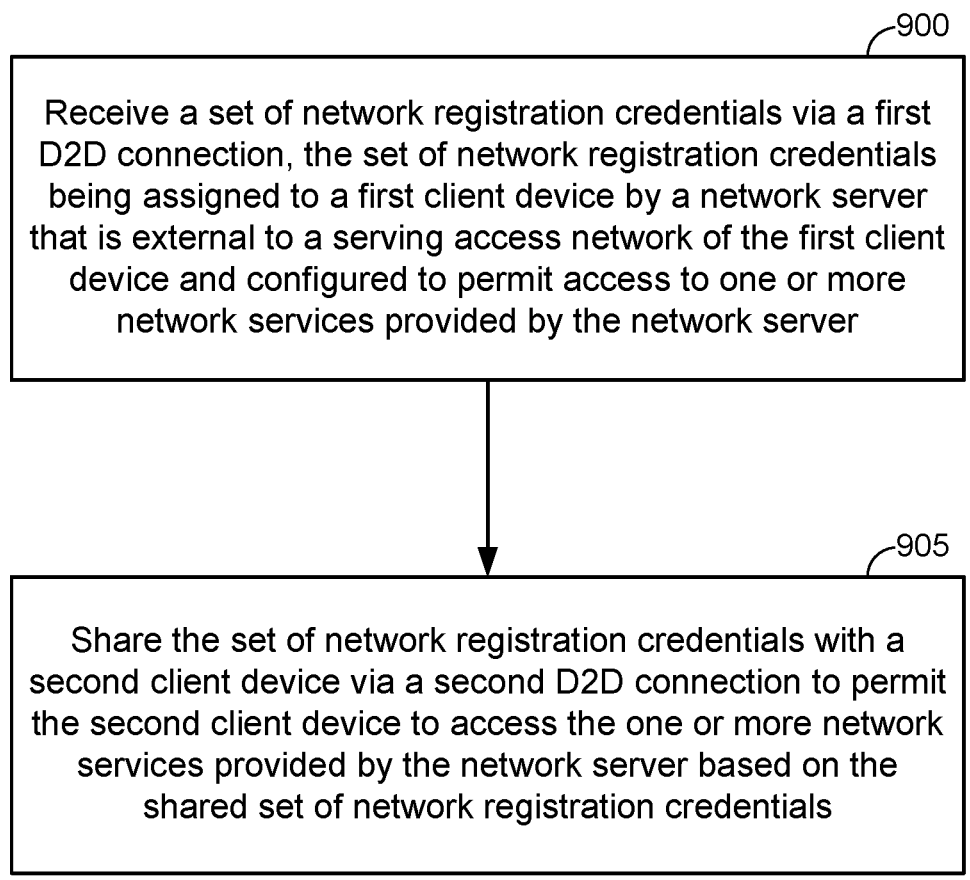
FIG. 9 illustrates a process of redistributing network registration credentials that are received from another D2D client device to which the shared network registration credentials are assigned in accordance with an embodiment of the disclosure.

FIG. 9 illustrates a process of redistributing network registration credentials that are received from another D2D client device to which the shared network registration credentials are assigned in accordance with an embodiment of the disclosure. For example, the process of FIG. 9 may be performed by a client device, such as any of UEs 1 . . . 3 in any of the D2D networks depicted in FIGS. 6A-6C, or alternatively by an AP, such as AP 605B of FIG. 6B or AP 605C of FIG. 6C.

Referring to FIG. 9, at block 900, the device receives a set of network registration credentials via a first D2D connection, the set of network registration credentials being assigned to a first client device (e.g., any of UEs 1 . . . 3 in any of the D2D networks depicted in FIGS. 6A-6C) by a network server (e.g., application server 170, server 400, an application server or a component of IMS network 500, etc.) that is external to a serving access network (e.g., RAN 120) of the first client device and configured to permit access to one or more network services provided by the network server. In an example, the set of network registration credentials received at block 800 may correspond to the set of network credentials shared at block 705 during the process of FIG. 7.

Referring to FIG. 9, at block 905, the device shares the set of network registration credentials with a second client device (e.g., any of UEs 1 . . . 3 in any of the D2D networks depicted in FIGS. 6A-6C) via a second D2D connection to permit the second client device to access the one or more network services provided by the network server based on the shared set of network registration credentials.

As will be appreciated, the process of FIG. 9 permits an AP or even another D2D client device to redistribute network registration credentials assigned to a particular D2D client device. In an example, the operation of block 900 can repeat multiple times, so that the device performing the process of FIG. 9 aggregates sets of network registration credentials assigned to different D2D client devices and/or by different network servers into a network registration credential table. The set of network registration credentials that is shared at block 905 can be selected from the network registration credential table based on one or more selection criteria, including whether or not the second client device identified a particular set of network registration credentials, whether or not the second client device identifies a desired network service (e.g., in which case block 905 will exclude one or more sets of network registration credentials that cannot provide the desired network service), or any combination thereof.

Figure 10A:
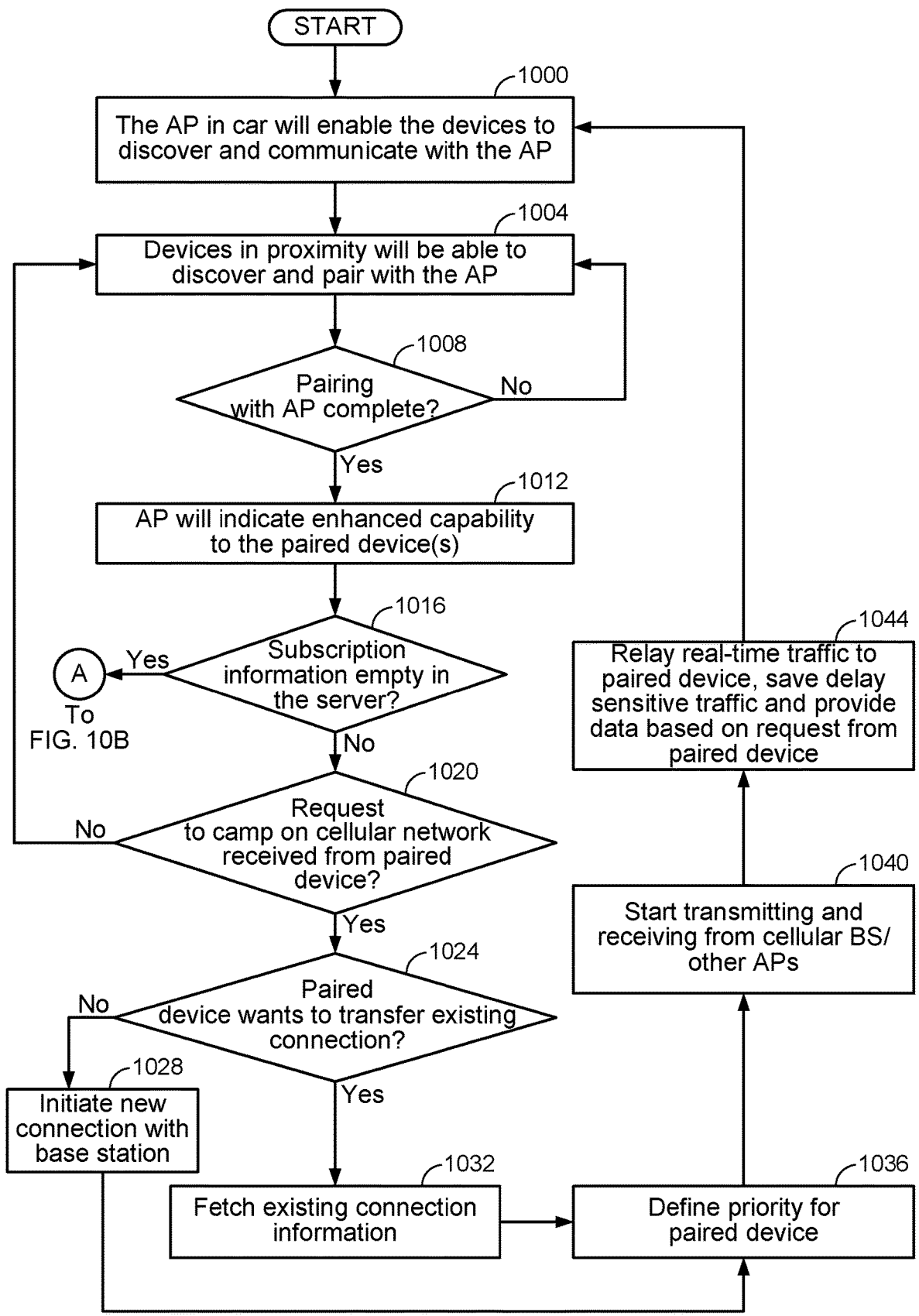
FIGS. 10A-10B, 11 illustrate more detailed implementations of certain aspects of the processes described above with respect to FIGS. 7-9 in accordance with an embodiment of the disclosure.
Figure 10B:
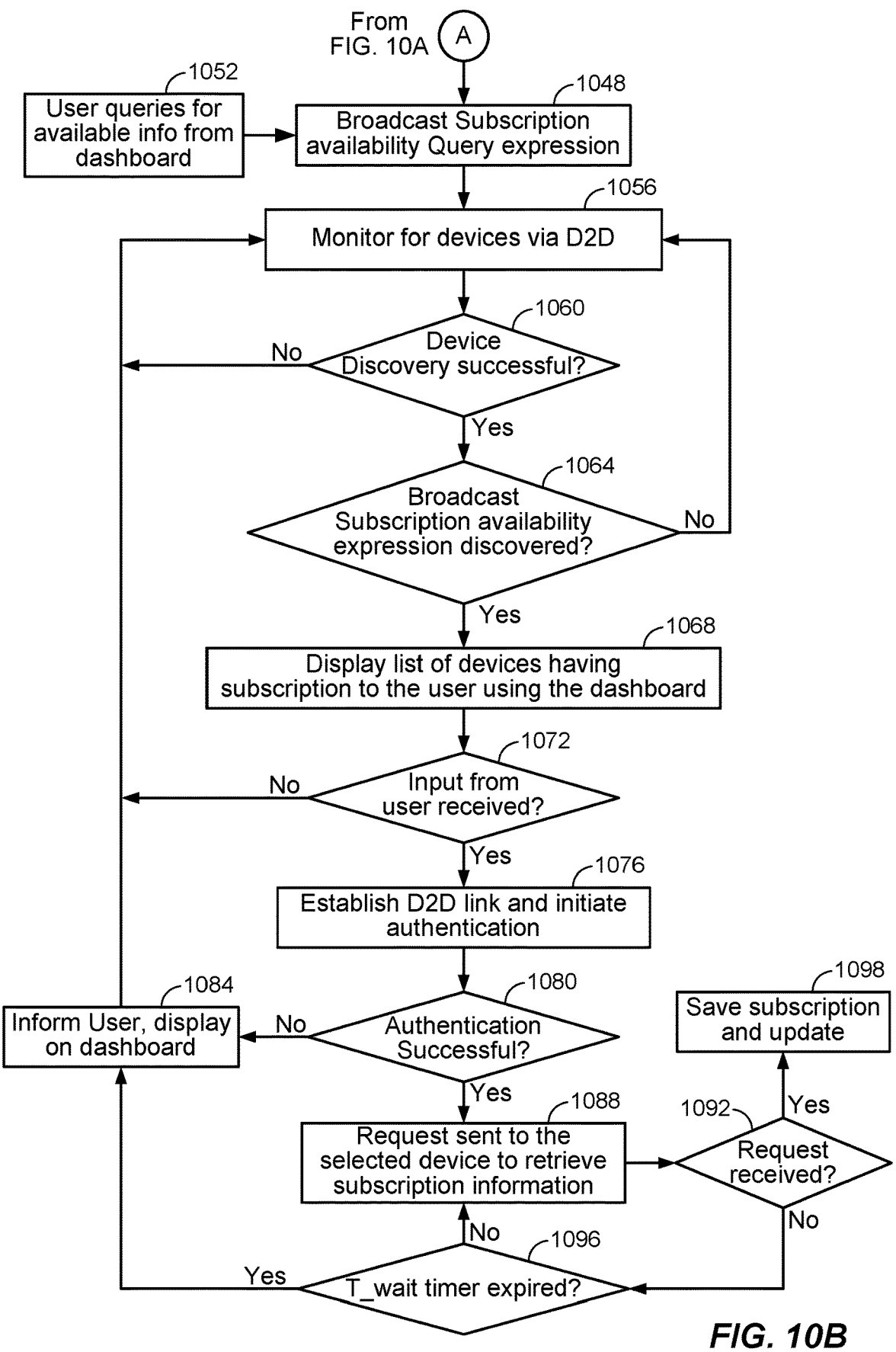
Figure 11:
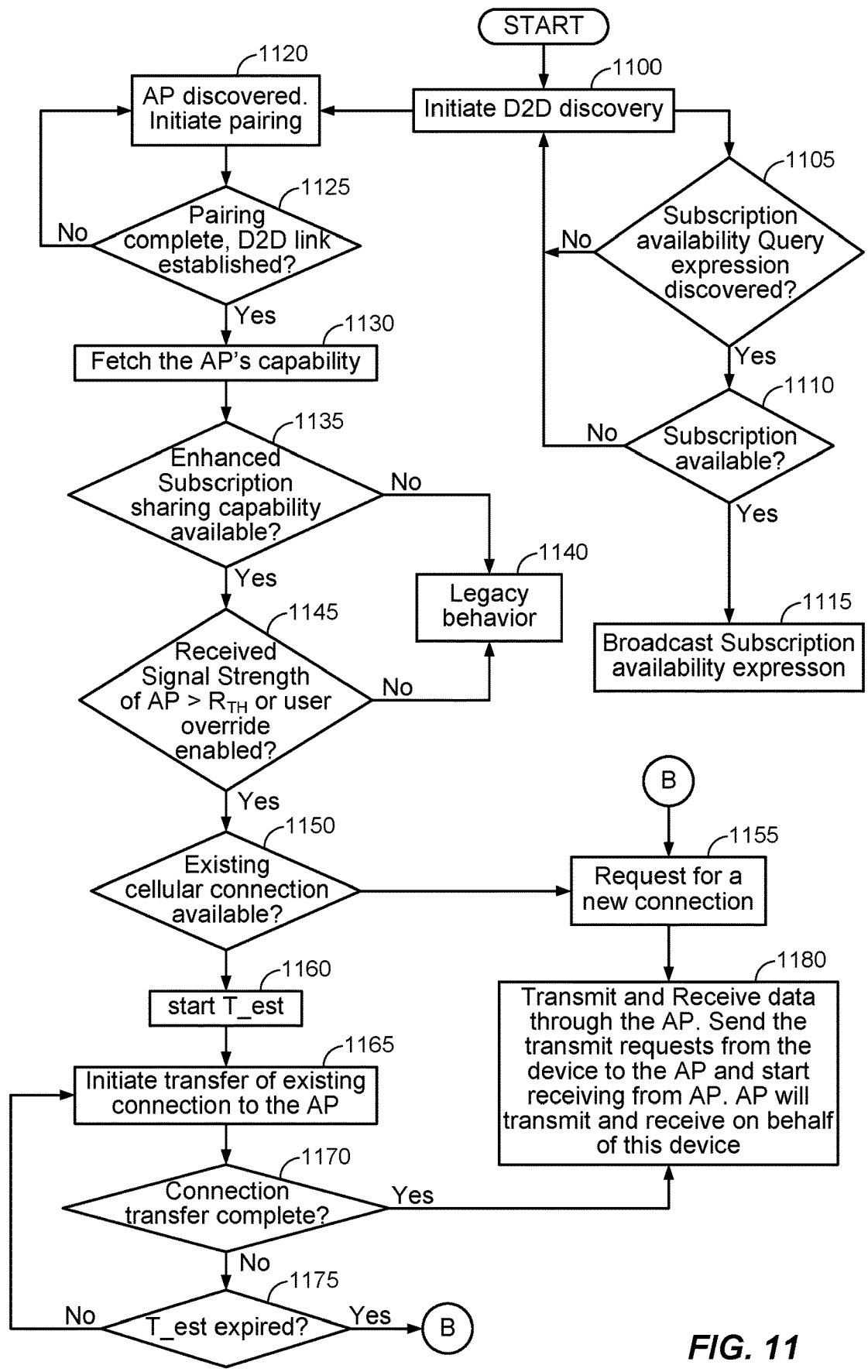

FIGS. 10A-11 illustrate more detailed implementations of certain aspects of the processes described above with respect to FIGS. 7-9 in accordance with embodiments of the disclosure. For example, as noted above, the processes of FIGS. 8-9 can be performed at a D2D client device or an AP, with FIGS. 10A-B depicting an AP-specific implementation of some aspects of these processes while FIG. 11 depicts D2D client device-specific implementation of some aspects of these processes. Further, the AP referred to with respect to FIGS. 10A-11 is provisioned within a car, although a vehicle-specific AP implementation is not required in other embodiments.

Referring to FIG. 10A, at block 1000, the AP in the car enables D2D client devices to discover and communicate with the AP. In an example of block 1000, the AP may broadcast a Service Set Identifier (SSID) to facilitate the discovery function. This permits any D2D client devices within communication range of the AP to discover the AP and pair with the AP, at block 1004. The AP determines whether pairing is complete at block 1008. If not, the process returns to block 1004. Otherwise, once pairing is complete, the AP indicates its enhanced capability function to each paired D2D client device at block 1012. In particular, at block 1012, the AP notifies each paired D2D client device that the AP is storing (e.g., in local memory or a local server connected to the AP) one or more sets of network registration credentials (e.g., subscription information) that can be used to access certain network services.

At block 1016, the AP determines whether to add new subscription information from one or more of the paired D2D client devices to the local server (e.g., such as when the subscription information in the local server is empty). If the AP determines to add new subscription information, the process advances to block 1048 (described below). Otherwise, at block 1020, the AP determines whether or not a request to camp on a cellular network using existing subscription information stored in the local server is received by one of the paired D2D client devices. If no request to camp on a cellular network using existing subscription information is received at block 1020, the process returns to block 1004. Otherwise, if a request to camp on a cellular network using existing subscription information is received at block 1020, the AP determines whether the requesting D2D client device is attempting to transfer an existing connection to the AP (e.g., handing off a transmit-receive function for a phone call to the AP to save battery life on the requesting D2D client device), at block 1024. If the AP determines that the requesting D2D client device is not attempting to transfer an existing connection to the AP at block 1024, then the AP initiates a new connection with a base station of the cellular network (and/or other types of wireless access points) at block 1028, after which the process advances to block 1036. Otherwise, if the AP determines that the requesting D2D client device is attempting to transfer an existing connection to the AP at block 1024, then the AP initiates fetches the existing cellular connection information and (if not already maintained at the AP) the subscription information from the requesting D2D client device, at block 1032. In an example, the AP may be provisioned with cellular connectivity (e.g., a MODEM and associated hardware/software) to access one or more radio access technology (RAT)-types (e.g., LTE, 3G, 4G, multiple RATs at the same time via multimode operation, etc.). After acquiring the cellular connection information and (optionally) the subscription information in block 1032, the process advances to block 1036.

Referring to FIG. 10A, at block 1036, the AP defines a priority for the requesting D2D client device based on the type of traffic carried on the communication session that is being supported on the AP. For example, a higher-priority may be allocated to a real-time or delay-sensitive communication session (e.g., a voice call, a PTT call, etc.), while a lower-priority may be allocated to other types of sessions (e.g., a file transfer session, etc.). The AP starts to transmit and receive data associated with the communication session from the cellular base station and/or other wireless access points at block 1040. At block 1044, the AP relays any real-time traffic for the communication session to the requesting D2D client device without delay, while saving any delay-sensitive traffic in the local server. The saved delay-sensitive traffic from block 1044 may be made available to the requesting D2D client device upon request. While the relaying function is performed at block 1044, the AP can continue to perform the D2D client device discovery procedure at block 1000.

Turning to FIG. 10B, at block 1048, the AP broadcasts a Subscription availability Query expression. The transmission of block 1048 can occur periodically, or in response to an event (e.g., detection that the AP does not have access to any subscription information at block 1016, or a user-initiated query for available subscription information from a dashboard interface of the car at block 1052). The AP monitors for any D2D client devices via a D2D interface at block 1056. At block 1060, if no D2D client devices are discovered, the process returns to block 1056 and the AP continues to monitor for one or more D2D client devices. If at least one D2D client device is discovered at block 1060, the AP determines if the discovered at least one D2D client device is broadcasting a subscription availability expression indicating that the discovered at least one D2D client device has subscription availability, at block 1064. At block 1064, if the discovered at least one D2D client device does not have subscription availability, the process returns to block 1056 and the AP continues to monitor for one or more D2D client devices. Otherwise, at block 1064, if the discovered at least one D2D client device has subscription availability, then a list of each discovered D2D client device with subscription availability is displayed to the user using the car dashboard at block 1068.

At block 1072, the AP determines whether any user input indicative of a device selection is received in response to the display of block 1068. If not, the process returns to block 1056 and the AP continues to monitor for one or more D2D client devices. Otherwise, if one of the displayed devices is selected at block 1072, then the AP establishes a D2D link with the selected D2D client device and initiates authentication at block 1076. At block 1080, if the authentication is not determined to be successful, then the AP sends a failure notification to the user via the car dashboard at block 1084.

Otherwise, at block 1080, if the authentication is determined to be successful, then a request is sent to the selected D2D client device to retrieve that device's subscription information at block 1088. If no subscription information is received in response to the request at block 1092, then the AP determines whether a wait timer (T_wait timer) with a given expiration period has expired at block 1096. In an example, T_wait timer may start running when the request is sent at block 1088. If T_wait timer expires at block 1096 before the requested subscription information is received from the selected device, then the process advances to block 1084. Otherwise, if the requested subscription information is received from the selected device at block 1092 before expiration of T_wait timer, then the AP saves the subscription information into the local server and updates one or more D2D client devices (e.g., the paired D2D client devices that have registered to receive subscription availability updates and/or have requested access to subscription information) regarding the new subscription information at block 1098.

While FIGS. 10A-B illustrate a particular sequence of operations, it will be appreciated that these operations can be executed in parallel and/or in different sequences in other embodiments of the disclosure. For example, the new subscription information acquisition procedure described between blocks 1048-1098 can occur in parallel with other subscription information being used to access network services as described between blocks 1000-1044. Moreover, the process of FIGS. 10A-B can execute at the AP in parallel with the process of FIG. 11 being executed at one or more D2D client devices in the car, as will now be described.

Referring to FIG. 11, a given D2D client device in the car initiates D2D discovery at block 1100. Based on the D2D discovery from block 1100, the given D2D client device determines whether a Subscription availability Query expression is discovered, at block 1105 (e.g., such as the Subscription availability Query expression that is broadcasted by the AP at block 1048 of FIG. 10B). If a Subscription availability Query expression is discovered at block 1105, then the given D2D client device determines whether any subscription information is available to be shared with the AP, at block 1110. If so, the given D2D client device broadcasts a Subscription availability expression at block 1115 (e.g., which can be received at the AP at block 1064 of FIG. 10B).

Turning back to block 1100, the D2D discovery can also result in the AP being discovered, which results in pairing between the given D2D client device and the AP being initiated at block 1120. If the pairing is determined not to be successful at block 1125, the process returns to block 1120 where the pairing initiation can be re-attempted. Otherwise, if the pairing is determined to be successful at block 1125, AP capability information is fetched at block 1130 (e.g., as described above with respect to block 1012 of FIG. 10A). If the AP capability information does not indicate that enhanced subscription information capability is available at block 1135, then the given D2D client device interacts with the AP in accordance with legacy behavior at block 1140. Also, if the AP capability information indicates that enhanced subscription information capability is available at block 1135 (e.g., as in block 1012 of FIG. 10A) but a received signal strength of the AP is less than or equal to a signal strength threshold ($R_{TH}$) and/or a user override is not enabled at block 1145, then the given D2D client device interacts with the AP in accordance with legacy behavior at block 1140. Otherwise, if the AP capability information indicates that enhanced subscription information capability is available at block 1135 (e.g., as in block 1012 of FIG. 10A) and a received signal strength of the AP is greater than $R_{TH}$ and/or a user override is enabled at block 1145, then the process advances to block 1150.

At block 1150, assume that the given D2D client device has determined to use enhanced subscription information capability of the AP to handle a communication session on behalf of the given D2D client device using either the given D2D client device's own subscription information or the subscription information of another D2D client device with which the AP is paired. In particular, at block 1150, the given D2D client device determines whether an existing cellular connection is available based on the given D2D client device's own subscription information. If not, the given D2D client device sends a request to the AP to setup a new connection using subscription information that was shared with the AP by some other D2D client device at block 1155 (e.g., as in blocks 1024-1028 of FIG. 10A), after which the process advances to block 1180.

Otherwise, if the given D2D client device determines that an existing cellular connection is available based on the given D2D client device's own subscription information at block 1150, the given D2D client device starts a timer (T_est) at block 1160. The given D2D client device initiates a transfer of subscription information for the existing cellular connection to the AP at block 1165 (e.g., as in block 1032 of FIG. 10A). If the connection transfer does not complete before expiration of T_est at blocks 1170-1175, then the process advances to block 1165 and a new connection is initiated. Otherwise, if the connection transfer completes before expiration of T_est at block 1170, then the AP performs the transmit-receive functions for the transferred connection that were previously performed by the given D2D client device at block 1180 (e.g., as in blocks 1040-1044 of FIG. 10A). As discussed above, this may involve the AP performing a relay function whereby a local D2D interface (e.g., Bluetooth, NFC, etc.) is used to exchange data to/from the given D2D client device, with the AP interacting with external cellular and/or non-cellular APs on behalf of the given D2D client device.

Figure 12:
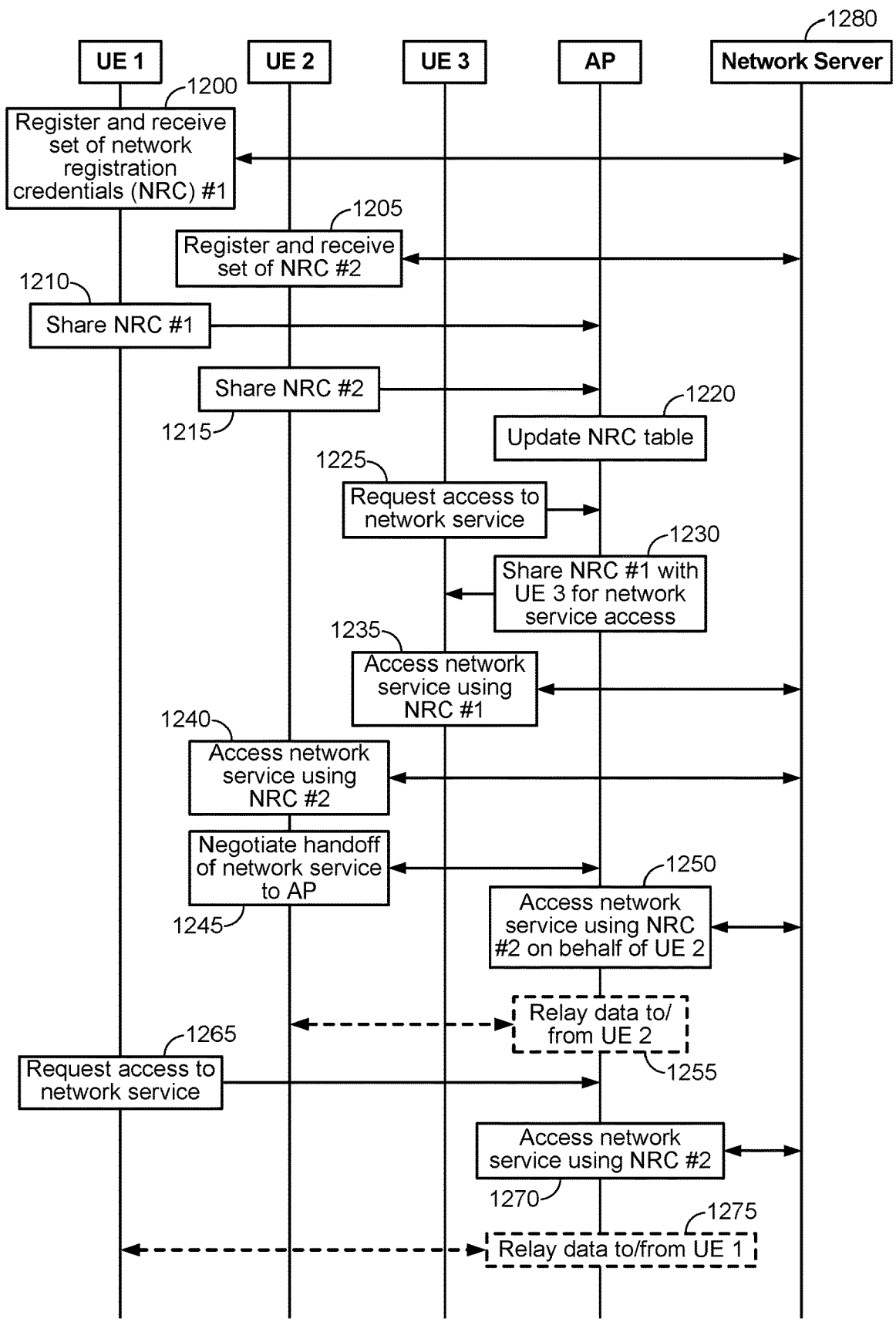
FIG. 12 illustrates AP-based implementations of the processes of FIGS. 7-9 with respect to the D2D network of FIG. 6B or FIG. 6C in accordance with embodiments of the disclosure.
Figure 13:
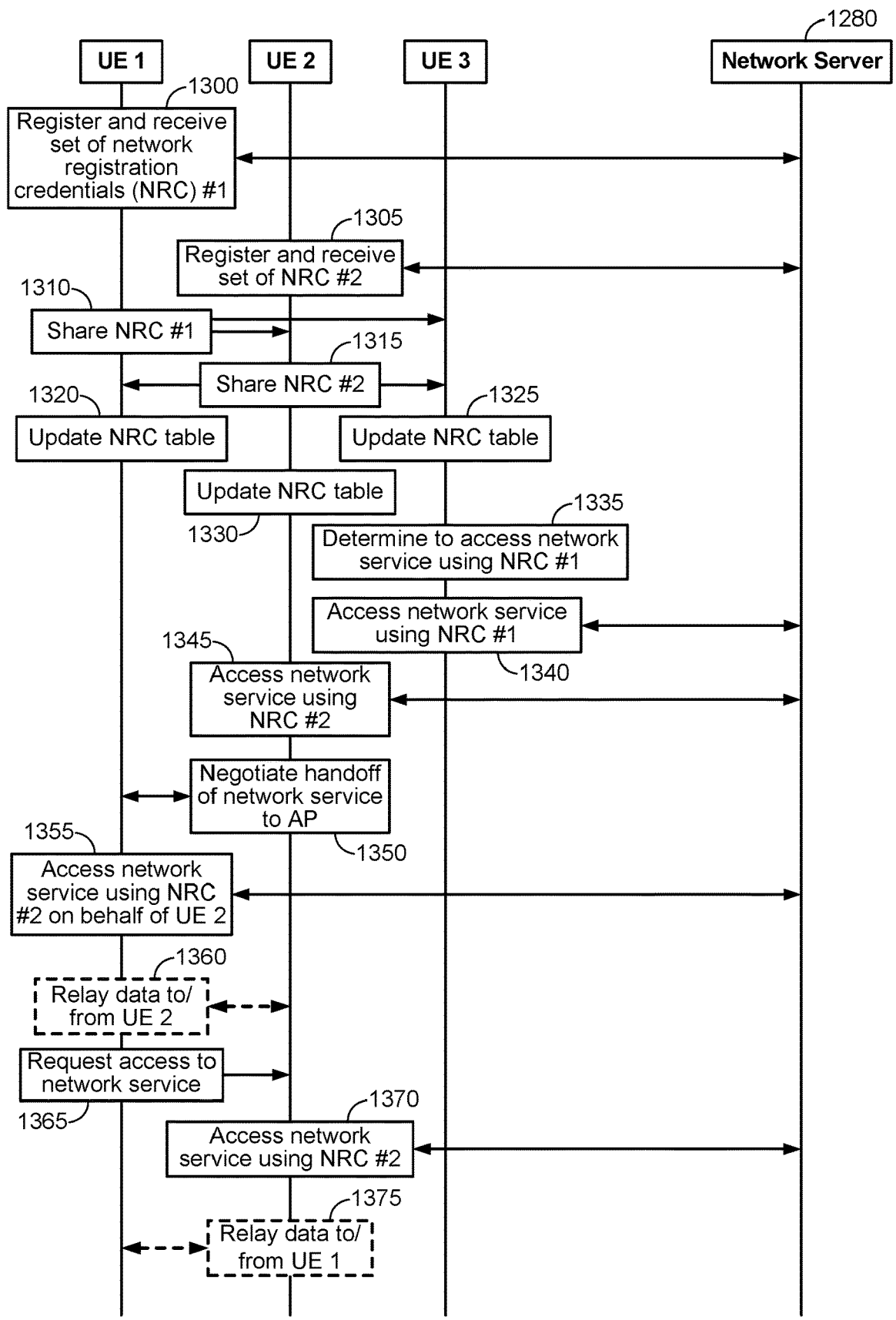
FIG. 13 illustrates implementations of the processes of FIGS. 7-9 that do not rely upon an access point (AP) with respect to the D2D network of FIG. 6A in accordance with embodiments of the disclosure.

As discussed above with respect to FIGS. 7-9, the AP is an optional component with respect to the network registration credential sharing procedures described in various embodiments of the disclosure. FIG. 12 illustrates AP-based implementations of the processes of FIGS. 7-9 with respect to the D2D network 600B of FIG. 6B or 600C of FIG. 6C in accordance with embodiments of the disclosure, while FIG. 13 illustrates implementations of the processes of FIGS. 7-9 that do not rely upon an AP with respect to the D2D network 600A of FIG. 6A in accordance with embodiments of the disclosure.

Referring to FIG. 12, UE 1 registers with a network server 1280 (e.g., application server 170, communications device 300, server 400, an application server or a component of IMS network 500, etc.) and receives a first set of network registration credentials at block 1200 (e.g., as in block 700 of FIG. 7). UE 2 also registers with the network server 1280 and receives a second set of network registration credentials at block 1205 (e.g., as in block 700 of FIG. 7). In an alternative embodiment, UEs 1 and 2 could receive network registration credentials from different network servers, and a single network server is described with respect to the process of FIG. 12 for convenience of explanation.

Referring to FIG. 12, UE 1 shares the first set of network registration credentials with the AP (e.g., AP 605B or AP 605C) over a D2D interface at block 1210 (e.g., as in block 705 of FIG. 7, block 800 of FIG. 8, block 900 of FIG. 9 and/or block 1092 of FIG. 10B), and UE 2 shares the second set of network registration credentials with the AP over the D2D interface at block 1215 (e.g., as in block 705 of FIG. 7, block 800 of FIG. 8, block 900 of FIG. 9 and/or block 1092 of FIG. 10B). The AP updates a network registration credential table to include the first and second sets of network registration credentials at block 1220 (e.g., similar to block 1098 of FIG. 10B). In an alternative embodiment, the network registration credentials can be shared with the AP as needed (e.g., in response to a request for network service access received by another D2D client device paired with the AP).

At some later point in time, UE 3 requests access to a network service at block 1225, and the AP shares the first set of network registration credentials with UE 3 to permit UE 3 to access the network service at block 1230 (e.g., as in block 800 of FIG. 8). In an example, the AP scans the network registration credential table to identify one or more sets of network registration credentials capable of providing the network service, and then selects the first set of network registration credentials from the identified set(s). Alternatively, the AP can simply facilitate a list of the available network registration credentials to be displayed to the user of UE 3 (e.g., via UE 3 or a separate display controlled by the AP) from which the user can indicate a selection of a desired credential to use to access the network service. UE 3 then uses the first set of network registration credentials (which is actually assigned by the network server 1280 to UE 1) to access the network service via the network server 1280 at block 1235 (e.g., as in block 805 of FIG. 8). It will be appreciated that the AP is not involved with the actual server interaction that occurs at block 1235, in contrast to the network service access scenarios described above with respect to FIGS. 10A-11.

At some later point in time, UE 2 begins to access a network service via the network server 1280 using its own set of network registration credentials (i.e., the second set of network registration credentials) at block 1240. During block 1240, UE 2 is performing a transmit-receive function that includes transmitting and/or receiving data between UE 2 and the RAN to exchange the data with the network server 1280 in association with the network service. UE 2 later decides to handoff the transmit-receive function to the AP, and thereby negotiates network service handoff to the AP at block 1245 (e.g., as in blocks 1020-1024 of FIG. 10A or blocks 1165-1170 of FIG. 11). The network server 1280 is not necessarily aware of this handoff, as the same set of network registration credentials will be used by the AP to interact with the network server 1280 in association with the network service. Also, because UE 2 already shared the second set of network registration credentials with the AP, the AP can simply load the second set of network registration credentials from the network registration credential table during block 1245. In an alternative embodiment, the sharing at block 1210 can be triggered by (and thereby performed in conjunction with) the handoff negotiation at block 1245.

At block 1250, the AP accesses the network service using the second set of network registration credentials on behalf of UE 2 (e.g., as in block 805 of FIG. 8 or blocks 1036-1044 of FIG. 10A). The AP optionally relays data to/from UE 2 in association with the network service over the D2D interface at block 1255, as described above with respect to blocks 1036-1044 of FIG. 10A and block 1180 of FIG. 11. Block 1255 is optional because the user of UE 2 could alternatively use a user interface (e.g., a car dashboard, in-vehicle audio system, etc.) associated with the AP to engage with the network server 1280 instead of a user interface on UE 2. For example, if the network service is a phone call and the AP is deployed in a vehicle, the phone call could be transferred to an in-vehicle audio system (with microphone(s) and speaker(s) such that UE 2 is bypassed altogether without the need to relay phone media between the AP and UE 2.

While blocks 1240-1255 show a network service connection that is transferred from UE 2 to the AP, it is also possible for the AP to initiate a new network service connection on behalf of any of its served UEs. At block 1265, UE 1 requests access to a network service that does not have an existing connection (or session) with UE 1. In contrast to UE 3 at blocks 1225-1235, assume that UE 1 wants the AP to handle the network service connection (e.g., to save battery life, etc.). At block 1270, the AP accesses the network service using the second set of network registration credentials on behalf of UE 1 (e.g., as in block 805 of FIG. 8 or blocks 1036-1044 of FIG. 10A). In an example, even though UE 1 has its own set of network registration credentials, UE 1 is not forced to use this particular set of network registration credentials for the network service session being supported via the AP. In an example, UE 1 may not want to use its own network registration credentials (e.g., because these credentials are being used for UE 3's network service session and no concurrent sessions are permitted by UE 1's particular network registration credentials, etc.), and UE 1 can indicate this preference to the AP in the request of block 1265. Alternatively, the AP may dynamically select the set of network registration credentials to be used for a particular network service session based on various selection criteria. The AP optionally relays data to/from UE 1 in association with the network service over the D2D interface at block 1275, similar to block 1255.

Referring to FIG. 13, UE 1 registers with the network server 1280 and receives a first set of network registration credentials at block 1300 (e.g., as in block 700 of FIG. 7). UE 2 also registers with the network server 1280 and receives a second set of network registration credentials at block 1305 (e.g., as in block 700 of FIG. 7). In an alternative embodiment, UEs 1 and 2 could receive network registration credentials from different network servers, and a single network server is described with respect to the process of FIG. 13 for convenience of explanation.

Referring to FIG. 13, UE 1 shares the first set of network registration credentials with UEs 2 and 3 over a D2D interface at block 1310 (e.g., as in block 705 of FIG. 7, block 800 of FIG. 8 and/or block 900 of FIG. 9), and UE 2 shares the second set of network registration credentials with UEs 1 and 3 over the D2D interface at block 1315 (e.g., as in block 705 of FIG. 7, block 800 of FIG. 8 and/or block 900 of FIG. 9). UEs 1 . . . 3 each update a network registration credential table to include the first and second sets of network registration credentials at blocks 1320-1330. Alternatively, while not depicted in FIG. 13, some UEs in the D2D network need not maintain complete network registration tables (e.g., if UE 3 is not interested in network services associated with the first set of network registration credentials, then the first set of network registration credentials need not be stored in UE 3's network registration table at block 1325). Further, in an alternative embodiment, the network registration credentials can be shared among the UEs connected to the D2D network as needed (e.g., in response to a request for network service access received from one of the connected UEs).

At some later point in time, at block 1335, UE 3 determines to access a network service using the first set of network registration credentials from UE 3's network registration credential table. In an example, UE 3 scans its network registration credential table to identify one or more sets of network registration credentials capable of providing the network service, and then selects the first set of network registration credentials from the identified set(s). UE 3 thereby uses the first set of network registration credentials (which is actually assigned by the network server 1280 to UE 1) to access the network service via the network server 1280 at block 1340 (e.g., as in block 805 of FIG. 8).

At some later point in time, UE 2 begins to access a network service via the network server 1280 using its own set of network registration credentials (i.e., the second set of network registration credentials) at block 1345. During block 1345, UE 2 is performing a transmit-receive function that includes transmitting and/or receiving data between UE 2 and the RAN to exchange the data with the network server 1280 in association with the network service. UE 2 later decides to handoff transmit-receive functions associated with the network service to UE 1 (e.g., because UE 1 has more battery life than UE 2, or UE 1 is plugged in and UE 2 is not, or UE 1 has network connectivity or a faster processor, etc.), and thereby negotiates network service handoff to UE 1 at block 1350. The network server 1280 is not necessarily aware of this handoff, as the same set of network registration credentials will be used by UE 1 to interact with the network server 1280 in association with the network service. Also, because UE 2 already shared the second set of network registration credentials with UE 1, UE 1 can simply load the second set of network registration credentials from the network registration credential table during block 1350. In an alternative embodiment, the sharing at block 1310 can be triggered by (and thereby performed in conjunction with) the handoff negotiation at block 1350.

At block 1355, UE 1 accesses the network service using the second set of network registration credentials on behalf of UE 2 (e.g., as in block 805 of FIG. 8). UE 1 optionally relays data to/from UE 2 in association with the network service over the D2D interface at block 1360. Block 1360 is optional because the user of UE 2 could alternatively simply switch to UE 1 and stop using UE 2 for interaction with the network service altogether.

While blocks 1345-1360 show a network service connection that is transferred from UE 2 to UE 1, it is also possible for a UE to initiate a new network service connection on behalf of any of other peer UE. At block 1365, UE 1 requests access to a network service that does not have an existing connection (or session) with UE 1. In contrast to UE 3 at blocks 1335-1340, assume that UE 1 wants UE 2 to handle the network service connection (e.g., to save battery life, etc.). At block 1370, UE 2 accesses the network service using the second set of network registration credentials on behalf of UE 1 (e.g., as in block 805 of FIG. 8). In an example, even though UE 1 has its own set of network registration credentials, UE 1 is not forced to use this particular set of network registration credentials for the network service session being supported via UE 2. In an example, UE 1 may not want to use its own network registration credentials (e.g., because these credentials are being used for UE 3's network service session and no concurrent sessions are permitted by UE 1's particular network registration credentials, etc.), and UE 1 can indicate this preference to UE 2 in the request of block 1365. Alternatively, UE 2 may dynamically select the set of network registration credentials to be used for a particular network service session based on various selection criteria. UE 2 optionally relays data to/from UE 1 in association with the network service over the D2D interface at block 1375. Block 1375 is optional because the user of UE 1 could alternatively simply switch to UE 2 and stop using UE 2 for interaction with the network service altogether.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a client device, comprising:
    pairing with one or more other client devices through a respective device-to-device (D2D) connection;
    receiving, from a network server that is external to a serving access network of the client device, a set of network registration credentials that are assigned to the client device and are configured to authorize access to one or more network services mediated by the network server via an exchange of data with the network server;
    sharing the set of network registration credentials with the paired client devices via the respective device-to-device (D2D) connection to permit the paired client devices to access the one or more network services mediated by the network server by using the shared set of network registration credentials;
    receiving, from the paired client devices, one or more sets of network registration credentials obtained by the paired client devices;
    updating a network registration credential table with the set of network registration credentials received from the network server and the sets of network registration credentials received from the paired client devices;
    identifying a set of network registration credentials in the network registration credential table based on a desired network service; and
    accessing the desired network service by using the identified set of network registration credentials.

2. The method of claim 1, further comprising:
    performing a transmit-receive function that includes transmitting data, receiving data, or both, between the client device and a radio access network (RAN) to exchange the data with the network server in association with a given network service; and
handing off the transmit-receive function to one of the paired client devices,
wherein the sharing facilitates the handing off of the transmit-receive function to the one of the paired client devices.

3. The method of claim 2,
wherein the sharing is performed in conjunction with the handing off, or
wherein the sharing is performed before initiation of the handing off.

4. The method of claim 1,
wherein the network server is an Internet Protocol (IP) Multimedia Subsystem (IMS) network component, and
wherein the one or more network services include one or more IMS services.

5. The method of claim 1, wherein the set of network registration credentials include at least one Subscriber Identity Module (SIM) credential, a username and password, or any combination thereof.

6. A method of operating an access point, comprising:
pairing with a plurality of client devices through a respective device-to-device (D2D) connection;
receiving a set of network registration credentials via the respective device-to-device (D2D) connection from each of the client devices having the set of network registration credentials, wherein the set of network registration credentials was assigned to each of the client devices by a network server that is external to a serving access network of the client device and configured to permit access to one or more network services mediated by the network server via an exchange of data with the network server;
adding each of the received set of network registration credentials to a network registration credential table;
receiving a request to access a network service from one of the client devices; and
sharing one of the set of network registration credentials in the network registration credential table with the requesting client device via the respective D2D connection to permit the requesting client device to access the one or more network services mediated by the network server based on the shared set of network registration credentials.

7. The method of claim 6, further comprising:
interacting with the network server to access the one or more network services based on the set of network registration credentials.

8. The method of claim 7,
wherein, prior to the interacting, the first client device performs a transmit-receive function that includes transmitting data, receiving data, or both, between the first client device and a radio access network (RAN) to exchange the data with the network server in association with a given network service, further comprising:
handing off the transmit-receive function to the device; and
performing the transmit-receive function on behalf of the first client device in response to the handing off,
wherein the receiving facilitates the handing off of the transmit-receive function to the device.

9. The method of claim 8,
wherein the receiving is performed in conjunction with the handing off, or
wherein the receiving is performed before initiation of the handing off.

10. The method of claim 7, wherein the interacting includes:
initiating a new connection with the network server with respect to a given network service.

11. The method of claim 10,
wherein the initiating is triggered by the first client device or a different client device with the device performing a transmit-receive function on behalf of the first client device or the different client device, the transmit-receive function transmitting data, receiving data, or both, between the device and a radio access network (RAN) to exchange the data with the network server in association with the given network service, or
wherein the initiating is triggered at the device without involvement of the first client device or the different client device.

12. The method of claim 7,
wherein the network server is an Internet Protocol (IP) Multimedia Subsystem (IMS) network component, and
wherein the one or more network services include one or more IMS services.

13. The method of claim 7, wherein the set of network registration credentials include at least one Subscriber Identity Module (SIM) credential, a username and password, or any combination thereof.

14. The method of claim 7, wherein the device is a peer client device of the first client device.

15. The method of claim 7, wherein the device is an access point.

16. The method of claim 15, wherein the access point is an in-vehicle access point.

17. The method of claim 7, further comprising:
updating, in response to the receiving, a network registration credential table to include the set of network registration credentials, wherein the network registration credential table includes one or more sets of network registration credentials assigned by the network server or a different network server to one or more other client devices.

18. The method of claim 17, wherein the interacting is based on a selection of the set of network registration credentials from the network registration credential table.

19. The method of claim 6, further comprising:
scanning a list of the sets of network registration credentials in the network registration credential table to identify one or more sets of network registration credentials capable of providing the network service requested by the requesting client device.

20. The method of claim 6, further comprising:
sending a list of the sets of network registration credentials in the network registration credential table to the requesting client device.

21. The method of claim 20, further comprising receiving a selection of one of the sets of network registration credentials in the list from the requesting client device.

22. The method of claim 6,
wherein the network server is an Internet Protocol (IP) Multimedia Subsystem (IMS) network component, and
wherein the one or more network services include one or more IMS services.

23. The method of claim 6, wherein the set of network registration credentials include at least one Subscriber Identity Module (SIM) credential, a username and password, or any combination thereof.

24. The method of claim 6,
wherein the device is a peer client device of the first and second client devices, or wherein the device is an access point.

25. A client device, comprising:
means for pairing with one or more other client devices through a respective device-to-device (D2D) connection;
means for receiving, from a network server that is external to a serving access network of the client device, a set of network registration credentials that are assigned to the client device and are configured to authorize access to one or more network services mediated by the network server via an exchange of data with the network server;
means for sharing the set of network registration credentials with the paired client devices via the respective device-to-device (D2D) connection to permit the paired client devices to access the one or more network services mediated by the network server by using the shared set of network registration credentials;
means for receiving, from the paired client devices, one or more sets of network registration credentials obtained by the paired client devices;
means for updating a network registration credential table with the set of network registration credentials received from the network server and the sets of network registration credentials received from the paired client devices;
means for identifying a set of network registration credentials in the network registration credential table based on a desired network service; and
means for accessing the desired network service by using the identified set of network registration credentials.

26. The client device of claim 25, further comprising:
means for performing a transmit-receive function that includes transmitting data, receiving data, or both, between the client device and a radio access network (RAN) to exchange the data with the network server in association with a given network service; and
means for handing off the transmit-receive function to one of the paired client devices,
wherein the sharing of the set of network registration credentials by the means for sharing facilitates the handoff of the transmit-receive function to the one of the paired client devices.

27. The client device of claim 26,
wherein the means for sharing shares the set of network registration credentials in conjunction with the handoff, or
wherein the means for sharing shares the set of network registration credentials before initiation of the handoff.

28. An access point, comprising:
means for pairing with a plurality of client devices through a respective device-to-device (D2D) connection;
means for receiving a set of network registration credentials via the respective device-to-device (D2D) connection from each of the client devices having the set of network registration credentials, wherein the set of network registration credentials was assigned to each of the client devices by a network server that is external to a serving access network of the client device and configured to permit access to one or more network services mediated by the network server via an exchange of data with the network server;
means for adding each of the received set of network registration credentials to a network registration credential table;

means for receiving a request to access a network service from one of the client devices; and
means for sharing one of the set of network registration credentials in the network registration credential table with the requesting client device via the respective D2D connection to permit the requesting client device to access the one or more network services mediated by the network server based on the shared set of network registration credentials.

29. The device of claim 28, further comprising:
means for interacting with the network server to access the one or more network services based on the set of network registration credentials.

30. The device of claim 29,
wherein, prior to the interaction, the first client device performs a transmit-receive function that includes transmitting data, receiving data, or both, between the first client device and a radio access network (RAN) to exchange the data with the network server in association with a given network service, further comprising:
means for handing off the transmit-receive function to the device; and
means for performing the transmit-receive function on behalf of the first client device in response to the handing off,
wherein receipt of the set of network registration credentials by the means for receiving facilitates the handing off of the transmit-receive function to the device.

31. The device of claim 30,
wherein the means for receiving receives the set of network registration credentials in conjunction with the handing off, or
wherein the receiving receives the set of network registration credentials before initiation of the handing off.

32. The device of claim 29, wherein the means for interacting initiates a new connection with the network server with respect to a given network service.

33. The device of claim 32,
wherein the initiation of the new connection with the network server is triggered by the first client device or a different client device with the device performing a transmit-receive function on behalf of the first client device or the different client device, the transmit-receive function transmitting data, receiving data, or both, between the device and a radio access network (RAN) to exchange the data with the network server in association with the given network service, or
wherein the initiation of the new connection with the network server is triggered without involvement of the first client device or the different client device.

34. The device of claim 29,
wherein the device is a peer client device of the first client device, or
wherein the device is an access point.

35. The device of claim 29, further comprising:
means for updating, in response to the receipt of the set of network registration credentials by the means for receiving, a network registration credential table to include the set of network registration credentials, wherein the network registration credential table includes one or more sets of network registration credentials assigned by the network server or a different network server to one or more other client devices.

36. The access point of claim 28, further comprising:
scanning a list of the sets of network registration credentials in the network registration credential table to identify one or more sets of network registration credentials capable of providing the network service requested by the requesting client device.

37. The access point of claim 28, further comprising:
means for sending a list of the sets of network registration credentials in the network registration credential table to the requesting client device.

38. A client device, comprising:
at least one processor coupled to transceiver circuitry and configured to:
 pair with one or more other client devices through a respective device-to-device (D2D) connection
 receive, from a network server that is external to a serving access network of the client device, a set of network registration credentials that are assigned to the client device and are configured to authorize access to one or more network services mediated by the network server via an exchange of data with the network server;
 share the set of network registration credentials with the paired client devices via the respective device-to-device (D2D) connection to permit the paired client devices to access the one or more network services mediated by the network server by using the shared set of network registration credentials;
 receive, from the paired client devices, one or more sets of network registration credentials obtained by the paired client devices;
 update a network registration credential table with the set of network registration credentials received from the network server and the sets of network registration credentials received from the paired client devices;
 identify a set of network registration credentials in the network registration credential table based on a desired network service; and
 access the desired network service by using the identified set of network registration credentials.

39. The client device of claim 38, wherein the at least one processor is further configured to:
 perform a transmit-receive function that includes transmitting data, receiving data, or both, between the client device and a radio access network (RAN) to exchange the data with the network server in association with a given network service; and
 handoff the transmit-receive function to one of the paired client devices,
 wherein the sharing of the set of network registration credentials facilitates the handoff of the transmit-receive function to the one of the paired client devices external device.

40. The client device of claim 39,
wherein the at least one processor shares the set of network registration credentials in conjunction with the handoff, or
wherein the at least one processor shares the set of network registration credentials before initiation of the handoff.

41. An access point, comprising:
at least one processor coupled to transceiver circuitry and configured to:
pair with a plurality of client devices through a respective device-to-device (D2D) connection;
receive a set of network registration credentials via the respective device-to-device (D2D) connection from each of the client devices having the set of network registration credentials, wherein the set of network registration credentials was assigned to each of the client devices by a network server that is external to a serving access network of the client device and configured to permit access to one or more network services mediated by the network server via an exchange of data with the network server;
add each of the received set of network registration credentials to a network registration credential table;
receive a request to access a network service from one of the client devices; and
share one of the set of network registration credentials in the network registration credential table with the requesting client device via the respective D2D connection to permit the requesting client device to access the one or more network services mediated by the network server based on the shared set of network registration credentials.

42. The device of claim 41,
wherein the at least one processor is further configured to:
 interact with the network server to access the one or more network services based on the set of network registration credentials.

43. The device of claim 42,
wherein, prior to the interaction, the first client device performs a transmit-receive function that includes transmitting data, receiving data, or both, between the first client device and a radio access network (RAN) to exchange the data with the network server in association with a given network service, wherein the at least one processor is further configured to:
 handoff the transmit-receive function to the device; and
 perform the transmit-receive function on behalf of the first client device in response to the handoff,
 wherein receipt of the set of network registration credentials facilitates the handoff of the transmit-receive function to the device.

44. The device of claim 43,
wherein the at least one processor receives the set of network registration credentials in conjunction with the handoff, or
wherein the at least one processor receives the set of network registration credentials before initiation of the handoff.

45. The device of claim 42, wherein the interaction includes initiation of a new connection with the network server with respect to a given network service.

46. The device of claim 45,
wherein the initiation of the new connection with the network server is triggered by the first client device or a different client device with the device performing a transmit-receive function on behalf of the first client device or the different client device, the transmit-receive function transmitting data, receiving data, or both, between the device and a radio access network (RAN) to exchange the data with the network server in association with the given network service, or
wherein the initiation of the new connection with the network server is triggered without involvement of the first client device or the different client device.

47. The device of claim 42,
wherein the device is a peer client device of the first client device, or
wherein the device is an access point.

48. The device of claim 42, wherein the at least one processor is further configured to:
 update, in response to the receipt of the set of network registration credentials, a network registration credential table to include the set of network registration credentials, wherein the network registration credential table includes one or more sets of network registration credentials assigned by the network server or a different network server to one or more other client devices.

49. The access point of claim 41,
wherein the at least one processor is further configured to scan a list of the sets of network registration credentials in the network registration credential table to identify one or more sets of network registration credentials capable of providing the network service requested by the requesting client device.

50. The access point of claim 41, wherein the at least one processor is further configured to send a list of the sets of network registration credentials in the network registration credential table to the requesting client device.

51. A non-transitory computer-readable medium containing instructions stored thereon, which, when executed by a client device, cause the client device to perform operations, the instructions comprising:
at least on instruction to cause the client device to pair with one or more other client devices through a respective device-to-device (D2D) connection;
at least one instruction to cause the client device to receive, from a network server that is external to a serving access network of the client device, a set of network registration credentials that are assigned to the client device and are configured to authorize access to one or more network services mediated by the network server via an exchange of data with the network server;
at least one instruction to cause the client device to share the set of network registration credentials with the paired client devices via the respective device-to-device (D2D) connection to permit the paired client devices to access the one or more network services mediated by the network server by using the shared set of network registration credentials;
at least one instruction to cause the client device to receive, from the paired client devices, one or more sets of network registration credentials obtained by the paired client devices;
at least one instruction to cause the client device to update a network registration credential table with the set of network registration credentials received from the network server and the sets of network registration credentials received from the paired client devices;
at least one instruction to cause the client device to identify a set of network registration credentials in the network registration credential table based on a desired network service; and
at least one instruction to cause the client device to access the desired network service by using the identified set of network registration credentials.

52. The non-transitory computer-readable medium of claim 51, further comprising:
at least one instruction to cause the client device to perform a transmit-receive function that includes transmitting data, receiving data, or both, between the client device and a radio access network (RAN) to exchange the data with the network server in association with a given network service; and
at least one instruction to cause the client device to handoff the transmit-receive function to one of the paired client devices,
wherein the sharing of the set of network registration credentials facilitates the handoff of the transmit-receive function to the one of the paired client devices.

53. The non-transitory computer-readable medium of claim 52,
wherein the at least one instruction to cause the client device to share causes the client device to share the set of network registration credentials in conjunction with the handoff, or
wherein the at least one instruction to cause the client device to share causes the client device to share the set of network registration credentials before initiation of the handoff.

54. A non-transitory computer-readable medium containing instructions stored thereon, which, when executed by an access point, cause the access point to perform operations, the instructions comprising:
at least one instruction to cause the access point to pair with a plurality of client devices through a respective device-to-device (D2D) connection;
at least one instruction to cause the access point to receive a set of network registration credentials via the respective device-to-device (D2D) connection from each of the client devices having the set of network registration credentials, wherein the set of network registration credentials was assigned to each of the client devices by a network server that is external to a serving access network of the client device and configured to permit access to one or more network services mediated by the network server via an exchange of data with the network server;
at least one instruction to cause the access point to adding each of the received set of network registration credentials to a network registration credential table;
at least one instruction to cause the access point to receiving a request to access a network service from one of the client devices; and
at least one instruction to cause the access point to share one of the set of network registration credentials in the network registration credential table with the requesting client device via the respective D2D connection to permit the requesting client device to access the one or more network services mediated by the network server based on the shared set of network registration credentials.

55. The non-transitory computer-readable medium of claim 54, further comprising:
at least one instruction to cause the device to interact with the network server to access the one or more network services based on the set of network registration credentials.

56. The non-transitory computer-readable medium of claim 55,
wherein, prior to the interaction, the first client device performs a transmit-receive function that includes transmitting data, receiving data, or both, between the first client device and a radio access network (RAN) to exchange the data with the network server in association with a given network service, further comprising:
at least one instruction to cause the device to handoff the transmit-receive function to the device; and
at least one instruction to cause the device to perform the transmit-receive function on behalf of the first client device in response to the handoff,
wherein receipt of the set of network registration credentials facilitates the handoff of the transmit-receive function to the device.

57. The non-transitory computer-readable medium of claim 56, wherein the at least one instruction to cause the device to receive causes the device to receive the set of network registration credentials in conjunction with the handoff, or wherein the at least one instruction to cause the device to receive causes the device to receive the set of network registration credentials before initiation of the handoff.

58. The non-transitory computer-readable medium of claim 56, wherein the device is a peer client device of the first client device, or wherein the device is an access point.

59. The non-transitory computer-readable medium of claim 56, further comprising:

at least one instruction to cause the device to update, in response to the receipt of the set of network registration credentials, a network registration credential table to include the set of network registration credentials, wherein the network registration credential table includes one or more sets of network registration credentials assigned by the network server or a different network server to one or more other client devices.

60. The non-transitory computer-readable medium of claim 55, wherein the at least one instruction to cause the device to interact causes the device to initiate of a new connection with the network server with respect to a given network service.

61. The non-transitory computer-readable medium of claim 60, wherein the initiation of the new connection with the network server is triggered by the first client device or a different client device with the device performing a transmit-receive function on behalf of the first client device or the different client device, the transmit-receive function transmitting data, receiving data, or both, between the device and a radio access network (RAN) to exchange the data with the network server in association with the given network service, or wherein the initiation of the new connection with the network server is triggered without involvement of the first client device or the different client device.

62. The non-transitory computer-readable medium of claim 54, further comprising:

at least one instruction to cause the access point to scan a list of the sets of network registration credentials in the network registration credential table to identify one or more sets of network registration credentials capable of providing the network service requested by the requesting client device.

63. The non-transitory computer-readable medium of claim 54, further comprising:

at least one instruction to cause the access point to send a list of the sets of network registration credentials in the network registration credential table to the requesting client device.

* * * * *